United States Patent
Hara

(10) Patent No.: US 10,073,178 B2
(45) Date of Patent: Sep. 11, 2018

(54) PLACEMENT STRUCTURE FOR PERIPHERAL INFORMATION DETECTING SENSOR, AND SELF-DRIVING VEHICLE

(71) Applicant: TOYOTA JIDOSHA KABUSHIKI KAISHA, Toyota-shi, Aichi-ken (JP)

(72) Inventor: Yasuhiro Hara, Odawara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/007,930

(22) Filed: Jan. 27, 2016

(65) Prior Publication Data

US 2016/0282155 A1 Sep. 29, 2016

(30) Foreign Application Priority Data

Mar. 24, 2015 (JP) ................. 2015-061223

(51) Int. Cl.
*G01S 17/93* (2006.01)
*G01S 7/481* (2006.01)
(Continued)

(52) U.S. Cl.
CPC ............ *G01S 17/936* (2013.01); *G01D 11/30* (2013.01); *G01S 7/4813* (2013.01); *B62D 25/02* (2013.01);
(Continued)

(58) Field of Classification Search
CPC .... G01S 7/4813; G01S 13/931; G01S 17/936; G01S 2013/9364; G01S 2013/9367;
(Continued)

(56) References Cited

U.S. PATENT DOCUMENTS 3,493,920 A * 2/1970 MacMunn ............ G01S 15/18
  342/71
3,749,197 A * 7/1973 Deutsch ............ B60K 31/0008
  180/169
(Continued)

FOREIGN PATENT DOCUMENTS

DE 2938764 A1 4/1980
EP 1662609 A1 5/2006
(Continued)

OTHER PUBLICATIONS

"Bumpers". Insurance Institute for Highway Safety, Highway Loss Data Institute. Mar. 2015. Retrieved Apr. 16, 2017 at <http://www.iihs.org/iihs/topics/t/bumpers/qanda>.*
(Continued)

*Primary Examiner* — Harshad R Patel
*Assistant Examiner* — Punam Roy
(74) *Attorney, Agent, or Firm* — Oliff PLC

(57) ABSTRACT

A sensor placement structure has: a vehicle skeleton member of a vehicle, the vehicle skeleton member having a hollow cross-section; a peripheral information detecting sensor that is mounted to a vehicle outer side of the vehicle skeleton member, the peripheral information detecting sensor having a detecting section that detects information about a periphery of the vehicle; and a cover that covers the peripheral information detecting sensor from a vehicle outer side of the peripheral information detecting sensor, the cover being composed of a material that is transmissive of a detection medium that is detected by the detecting section.

18 Claims, 13 Drawing Sheets

(51) Int. Cl.

| | | |
|---|---|---|
| *G01D 11/30* | (2006.01) | |
| *B62D 25/02* | (2006.01) | |
| *B62D 25/04* | (2006.01) | |
| *G01S 13/93* | (2006.01) | |
| *G01S 7/02* | (2006.01) | |
| *G01D 11/24* | (2006.01) | |

(52) U.S. Cl.
CPC .............. *B62D 25/04* (2013.01); *G01D 11/245* (2013.01); *G01S 2007/027* (2013.01); *G01S 2013/9385* (2013.01); *G01S 2013/9392* (2013.01)

(58) Field of Classification Search
CPC ....... G01S 2013/9385; G01S 2007/027; G01S 2013/9392; B60R 11/04; B60R 2011/004; B60W 30/16; B62D 25/00; G01D 11/245; G01D 11/30
See application file for complete search history.

(56) References Cited

U.S. PATENT DOCUMENTS

| | | | | |
|---|---|---|---|---|
| 3,794,997 | A | | 2/1974 | Iwatsuki et al. |
| 3,935,922 | A | * | 2/1976 | Cooper ............... A47L 11/4011 180/168 |
| 4,063,258 | A | * | 12/1977 | Allen ................... G03B 15/035 352/132 |
| 4,345,662 | A | * | 8/1982 | Deplante ................... B60T 7/18 180/168 |
| 4,346,774 | A | | 8/1982 | Hirota et al. |
| 4,373,161 | A | * | 2/1983 | Matsumura .............. B60Q 1/54 180/167 |
| 4,818,099 | A | * | 4/1989 | Preikschat ............ G01S 7/4812 257/433 |
| 4,846,297 | A | * | 7/1989 | Field .................... G01S 17/936 180/169 |
| 4,993,510 | A | * | 2/1991 | Kato ................... B60R 11/0217 181/141 |
| 5,033,569 | A | * | 7/1991 | Hayes .................. B60R 19/205 180/169 |
| 5,114,060 | A | * | 5/1992 | Boyer ....................... B62J 7/06 224/413 |
| 5,266,955 | A | * | 11/1993 | Izumi ................... G01S 17/936 342/54 |
| 5,491,464 | A | * | 2/1996 | Carter .................... B60Q 1/2611 340/425.5 |
| 5,557,116 | A | * | 9/1996 | Masui ................. H01S 5/02244 257/100 |
| 5,573,299 | A | * | 11/1996 | Masuda ................. B60K 11/04 180/68.4 |
| 5,713,586 | A | * | 2/1998 | Haller ................... A47D 13/043 180/169 |
| 5,767,793 | A | | 6/1998 | Agravante et al. |
| 5,911,395 | A | * | 6/1999 | Hussaini ................. B60R 11/00 248/206.3 |
| 5,999,865 | A | * | 12/1999 | Bloomquist ......... G05D 1/0248 299/1.05 |
| 6,020,844 | A | * | 2/2000 | Bai ...................... G01S 7/4026 342/147 |
| 6,119,067 | A | * | 9/2000 | Kikuchi ................ G01S 7/4026 342/158 |
| 6,157,294 | A | * | 12/2000 | Urai ........................ B60Q 1/52 307/10.1 |
| 6,204,820 | B1 | * | 3/2001 | Jensen, Jr. ............ H01Q 1/005 296/180.1 |
| 6,318,774 | B1 | * | 11/2001 | Karr ..................... B60R 19/483 293/102 |
| 6,496,138 | B1 | * | 12/2002 | Honma ................. G01S 13/931 342/27 |
| 6,508,325 | B1 | * | 1/2003 | Schwarz ................. B60Q 9/006 180/167 |
| 6,572,161 | B2 | * | 6/2003 | Wild ..................... B60R 19/483 293/117 |
| 6,653,650 | B2 | * | 11/2003 | McMillan ............. G01B 11/272 250/548 |
| 6,744,399 | B2 | * | 6/2004 | Tohyama ............... G01S 7/4026 342/165 |
| 6,765,480 | B2 | * | 7/2004 | Tseng .................. G06K 9/00805 340/425.5 |
| 6,933,837 | B2 | * | 8/2005 | Gunderson ........... B60R 21/013 180/167 |
| 6,961,023 | B2 | * | 11/2005 | Fujii .................... B29C 45/1671 343/700 MS |
| 7,023,331 | B2 | * | 4/2006 | Kodama ................ G01S 7/4008 340/435 |
| 7,102,496 | B1 | | 9/2006 | Ernst, Jr. et al. |
| 7,110,324 | B2 | * | 9/2006 | Ho ........................ B60R 19/483 340/435 |
| 7,365,676 | B2 | * | 4/2008 | Mende .................. G01S 13/931 342/118 |
| 7,508,353 | B2 | * | 3/2009 | Shingyoji ............. H01Q 1/3233 342/1 |
| 7,592,592 | B2 | * | 9/2009 | Eriksson ................... B60R 1/00 250/330 |
| 7,626,888 | B2 | | 12/2009 | Nakano et al. |
| 7,705,771 | B2 | * | 4/2010 | Kato ......................... G01S 7/35 342/175 |
| 7,733,370 | B2 | * | 6/2010 | Werth ..................... B60Q 1/245 348/143 |
| 7,852,258 | B2 | * | 12/2010 | Kato ..................... G01S 7/4008 342/165 |
| 7,902,968 | B2 | | 3/2011 | Kojima et al. |
| 7,988,212 | B2 | * | 8/2011 | Hartley ................ B60R 19/483 293/117 |
| 8,149,157 | B2 | * | 4/2012 | Takeuchi .................. G01S 7/03 342/70 |
| 8,816,932 | B2 | * | 8/2014 | Kawaguchi .......... C23C 14/0015 235/487 |
| 8,864,197 | B2 | * | 10/2014 | Schneider ............ H01Q 1/3233 293/117 |
| 9,010,844 | B2 | * | 4/2015 | Hasegawa ............ B62D 25/082 180/68.1 |
| 9,056,586 | B2 | * | 6/2015 | Huttenlocher .......... B60R 11/02 |
| 9,081,094 | B2 | * | 7/2015 | Holt ..................... G01S 13/882 |
| 9,145,286 | B2 | * | 9/2015 | Pfaff ....................... B66F 9/063 |
| 9,348,014 | B2 | * | 5/2016 | Lee ....................... G01S 17/936 |
| 9,377,529 | B2 | * | 6/2016 | Lieven .................. G01S 13/882 |
| 9,436,182 | B2 | * | 9/2016 | Nemec ................. G05D 1/0055 |
| 9,525,206 | B2 | * | 12/2016 | Abe ........................ H01Q 13/02 |
| 9,527,435 | B2 | * | 12/2016 | Michie ................... B60Q 1/2611 |
| 9,533,627 | B2 | * | 1/2017 | Sugiura .................. B44C 5/0415 |
| 9,618,615 | B2 | * | 4/2017 | Inada .................... G01S 13/931 |
| 9,673,517 | B2 | * | 6/2017 | Tran ...................... H01Q 1/1207 |
| 9,838,653 | B2 | * | 12/2017 | Fish, Jr. ................ B60R 11/04 |
| 2001/0026237 | A1 | * | 10/2001 | Okai ...................... H01Q 1/405 342/70 |
| 2002/0067305 | A1 | * | 6/2002 | LeBlanc ................ B60K 31/0008 342/198 |
| 2003/0052810 | A1 | * | 3/2003 | Artis ..................... H01Q 1/3233 342/1 |
| 2003/0128164 | A1 | * | 7/2003 | Rahaim ................. H01Q 1/405 343/700 MS |
| 2003/0202097 | A1 | * | 10/2003 | Kallhammer ............. B60R 1/00 348/148 |
| 2004/0004541 | A1 | * | 1/2004 | Hong ....................... B60R 1/00 340/435 |
| 2004/0183661 | A1 | * | 9/2004 | Bowman ................. G08G 1/165 340/435 |
| 2004/0227663 | A1 | * | 11/2004 | Suzuki ...................... G01S 7/03 342/70 |
| 2005/0140785 | A1 | * | 6/2005 | Mazzilli .................. B60R 1/12 348/148 |
| 2005/0242933 | A1 | * | 11/2005 | Loh ...................... B60R 19/483 340/435 |
| 2006/0162982 | A1 | * | 7/2006 | Lich ...................... B60R 21/013 180/271 |

(56) References Cited

U.S. PATENT DOCUMENTS

| | | | |
|---|---|---|---|
| 2006/0284515 A1* | 12/2006 | Nakajima | B60R 19/483 310/311 |
| 2007/0013200 A1* | 1/2007 | Totani | B60R 11/02 296/1.07 |
| 2008/0277951 A1 | 11/2008 | Rathje et al. | |
| 2009/0102700 A1 | 4/2009 | Kato et al. | |
| 2010/0020306 A1 | 1/2010 | Hall | |
| 2013/0038734 A1* | 2/2013 | Furukawa | H04N 7/18 348/148 |
| 2013/0141269 A1* | 6/2013 | Schneider | H01Q 1/3233 342/70 |
| 2013/0162028 A1* | 6/2013 | Bierley | B60R 16/0215 307/10.1 |
| 2014/0070982 A1* | 3/2014 | Inada | B60R 19/483 342/188 |
| 2014/0091969 A1* | 4/2014 | Shi | G01S 13/931 342/385 |
| 2014/0111370 A1* | 4/2014 | Aleem | B60R 19/483 342/70 |
| 2014/0247390 A1* | 9/2014 | Ohsumi | B60R 11/04 348/373 |
| 2014/0368375 A1* | 12/2014 | Baftiu | H01Q 17/00 342/70 |
| 2015/0142271 A1* | 5/2015 | Cuddihy | B60R 19/16 701/45 |
| 2015/0274091 A1* | 10/2015 | Lang | B60R 11/04 348/148 |
| 2016/0097848 A1* | 4/2016 | Jehamy | G01S 13/08 342/120 |
| 2016/0121799 A1* | 5/2016 | McClintock | B60Q 1/2661 224/309 |
| 2016/0236725 A1* | 8/2016 | Shirai | B62D 35/00 |
| 2016/0248152 A1* | 8/2016 | Takao | H01Q 1/44 |
| 2016/0282155 A1* | 9/2016 | Hara | G01S 17/936 |
| 2016/0291151 A1* | 10/2016 | Dechoux | B60R 19/483 |
| 2017/0297521 A1* | 10/2017 | Sugie | G01S 7/4813 |

FOREIGN PATENT DOCUMENTS

| | | | | | |
|---|---|---|---|---|---|
| GB | | 2076610 | A | | 12/1981 |
| JP | | 2991659 | B2 | | 12/1999 |
| JP | | 2005-291808 | A | | 10/2005 |
| JP | | 2007-142967 | A | | 6/2007 |
| JP | | 2007-147319 | A | | 6/2007 |
| JP | | 2007-187632 | A | | 7/2007 |
| JP | | 2007-274686 | A | | 10/2007 |
| JP | | 2008-536743 | A | | 9/2008 |
| JP | | 2014-070899 | A | | 4/2014 |
| JP | | 2014-134414 | A | | 7/2014 |
| WO | WO 2014068302 | A1 | * | 5/2014 | G01S 17/023 |

OTHER PUBLICATIONS

"Will driverless cars ever look normal?" MojoMotors.com, Oct. 9, 2014.*

AG Reporter, "Google scores yet another win". Arabian Gazette. Dec. 28, 2011. Retrieved Apr. 17, 2017 at <http://www.arabiangazette.com/google-scores-win/>.*

Travers, Jim. "Pros and Cons of Aluminum Cars and Trucks." Consumer Reports, Feb. 4, 2015, <www.consumerreports.org/cro/news/2015/02/pros-and-cons-of-aluminum-cars-and-trucks/index.htm.>, Accessed online Feb. 14, 2018.*

Kaartinen, Harri, et al. "Benchmarking the performance of mobile laser scanning systems using a permanent test field." Sensors 12.9 (2012): 12814-12835.*

Dec. 15, 2017 Office Action issued in U.S. Appl. No. 15/041,482.
Apr. 21, 2017 Office Action issued in U.S. Appl. No. 15/041,482.
Mar. 21, 2018 Advisory Action issued in U.S. Appl. No. 15/041,482.
Tokoro et al. "Pre-crash sensor for pre-crash safety." The 18th International Technical Conference on the Enhanced Safety of Vehicles (ESV) Proceedings, Paper. No. 545. 2003.
Shirakawa et al. "3d-scan millimeter-wave radar for automotive application." Fujitsu Ten Tech. J. 1 (2013): 3-7.
Apr. 19, 2018 Office Action issued in U.S. Appl. No. 15/041,482.

* cited by examiner

PLACEMENT STRUCTURE FOR PERIPHERAL INFORMATION DETECTING SENSOR, AND SELF-DRIVING VEHICLE

CROSS-REFERENCE TO RELATED APPLICATION

This application claims priority under 35 USC 119 from Japanese Patent Application No. 2015-061223 filed Mar. 24, 2015, the entire disclosure of which is incorporated by reference herein.

BACKGROUND

Technical Field

The disclosure relates to a placement structure for a peripheral information detecting sensor, and to a self-driving vehicle.

Related Art

US Patent Application Publication No. 2010/0020306 discloses a structure in which a Lidar system (a peripheral information detecting sensor), that is equipped with photon detectors (detecting portions) for detecting peripheral information of a vehicle, is disposed on the roof of the vehicle. In addition, structures in which an optical camera or the like is disposed at the vehicle inner side of a front windshield are known.

SUMMARY

In a structure in which a peripheral information detecting sensor is disposed on a roof, the peripheral information detecting sensor is conspicuous, and there is the concern that it will mar the external appearance of the vehicle. On the other hand, in a structure in which a peripheral information detecting sensor is disposed at the vehicle inner side of a front windshield, it is difficult to ensure the mounting rigidity of the sensor, and there are cases in which the detection accuracy of the peripheral information detecting sensor deteriorates due to vibration and the like at the time when the vehicle is traveling.

In view of the above-described circumstances, an object of the embodiments is to provide a placement structure (a sensor placement structure) for a peripheral information detecting sensor, and a self-driving vehicle, that can maintain the detection precision of the peripheral information detecting sensor without marring the external appearance of the vehicle.

A placement structure for a peripheral information detecting sensor of a first aspect has: a vehicle skeleton member of a vehicle, the vehicle skeleton member having a hollow cross-section; a peripheral information detecting sensor that is mounted to a vehicle outer side of the vehicle skeleton member, the peripheral information detecting sensor having a detecting section that detects information about a periphery of the vehicle; and a cover that covers the peripheral information detecting sensor from the vehicle outer side of the peripheral information detecting sensor, the cover being composed of a material that is transmissive of a detection medium that is detected by the detecting section.

In the placement structure for a peripheral information detecting sensor of the first aspect, the peripheral information detecting sensor has the detecting section that detects peripheral information about a periphery of the vehicle. Further, the peripheral information detecting sensor is mounted to the vehicle outer side of a vehicle skeleton member that has a closed cross-sectional structure. By mounting the peripheral information detecting sensor to a vehicle skeleton member having a closed cross-sectional structure in this way, the mounting rigidity can be ensured, and vibration of the peripheral information detecting sensor at the time when the vehicle is traveling can be suppressed.

Further, because the peripheral information detecting sensor is covered from the vehicle outer side by the cover, there is no need for the peripheral information detecting sensor to be exposed to the vehicle outer side. Moreover, because the cover transmits therethrough the detection medium that the detecting section of the peripheral information detecting sensor uses in detection, marring of the external appearance of the vehicle can be suppressed while it is made possible to detect peripheral information of the vehicle by the peripheral information detecting sensor. Note that what is called "detection medium" here is a concept that includes various detection media and the like that can be detected by a sensor, and includes radio waves, light, and ultrasonic waves.

A sensor placement structure of a second aspect includes the first aspect, wherein the vehicle skeleton member is formed by a member that is electrically conductive.

In the placement structure for a peripheral information detecting sensor of the second aspect, the vehicle skeleton member is electrically conductive. Therefore, among the electromagnetic waves that are generated at the vehicle cabin inner side, the electromagnetic waves that are directed toward the peripheral information detecting sensor can be blocked by this vehicle skeleton member. Due thereto, the peripheral information detecting sensor being affected by electromagnetic noise can be suppressed.

A sensor placement structure of a third aspect includes the first aspect or the second aspect, wherein the peripheral information detecting sensor detects peripheral information about the periphery of the vehicle by transmitting and receiving radio waves at the detecting section, and the cover is opaque and transmissive of the radio waves.

In the placement structure for a peripheral information detecting sensor of the third aspect, by forming the cover from an opaque member, the peripheral information detecting sensor can be made difficult to be seen from the vehicle outer side. Further, by using a sensor that transmits and receives electromagnetic waves as the peripheral information detecting sensor, even in a case in which the cover is opaque, the detection accuracy of the peripheral information detecting sensor can be ensured. Note that what is called "opaque member" here includes members through which some light is transmitted, and thus semi-transparent members are included. Even in a case in which the cover is formed from a semi-transparent member, the peripheral information detecting sensor can be made difficult to be seen, and therefore, the design of the vehicle can be ensured as compared with a case in which the cover is formed by a transparent member.

A sensor placement structure of a fourth aspect includes the third aspect, wherein the cover is made to be a same color as a body of the vehicle.

In the placement structure for a peripheral information detecting sensor of the fourth aspect, by making the cover be the same color as the body, the color of the vehicle is made uniform, and a sense of incongruity with respect to the cover can be avoided.

A sensor placement structure of a fifth aspect includes any one of the first aspect through the fourth aspect, and further comprises a wire harness extending from the peripheral information detecting sensor and disposed along an outer surface of the vehicle skeleton member, wherein a guide groove, in which the wire harness is placed, is formed in the outer surface of the vehicle skeleton member.

In the placement structure for a peripheral information detecting sensor of the fifth aspect, by placing the wire harness in the guide groove, the gap between the cover and the vehicle skeleton member can be made to be small as compared with a case in which the wire harness is disposed at the vehicle outer side of a vehicle skeleton member at which there is no guide groove. Due thereto, the amount of projecting-out of the cover with respect to the vehicle main body can be suppressed.

A sensor placement structure of a sixth aspect includes any one of the first aspect through the fifth aspect, wherein the peripheral information detecting sensor is disposed at a vehicle inner side of a fender panel.

In the placement structure for a peripheral information detecting sensor of the sixth aspect, as compared with a structure in which the peripheral information detecting sensor is disposed at the vehicle front end portion or the vehicle rear end portion, the mounted state of the peripheral information detecting sensor can be maintained even in a case in which the vehicle is involved in a minor collision in the longitudinal direction. Further, peripheral information of the lower side of the vehicle side portion, which is a dead angle region of a passenger, can be detected.

A sensor placement structure of a seventh aspect includes any one of the first aspect through the fifth aspect, wherein the peripheral information detecting sensor is disposed at an upper portion of a front pillar of the vehicle.

In the placement structure for a peripheral information detecting sensor of the seventh aspect, peripheral information of the vehicle can be detected from the same height as the eye line of an occupant, or from a position that is higher than the eye line of the occupant.

A sensor placement structure for a peripheral information detecting sensor of an eighth aspect has: a roof rail disposed on a roof panel of a vehicle, the roof rail having a hollow cross-section; a peripheral information detecting sensor that is mounted to a vehicle transverse direction outer side of the roof rail, the peripheral information detecting sensor having a detecting section that detects peripheral information about a periphery of the vehicle; and a cover that covers the peripheral information detecting sensor from the vehicle transverse direction outer side, the cover being composed of a material that is transmissive of a detection medium that is detected by the detecting section.

In the placement structure for a peripheral information detecting sensor of the eighth aspect, by mounting the peripheral information detecting sensor to a roof rail that is a closed cross-sectional structure, the mounting rigidity can be ensured in the same way as in a case in which the peripheral information detecting sensor is mounted to a vehicle skeleton member configured as a closed cross-sectional structure. Due thereto, vibration of the peripheral information detecting sensor at the time when the vehicle is traveling can be suppressed.

Further, because the peripheral information detecting sensor is covered from the vehicle outer side by the cover, there is no need for the peripheral information detecting sensor to be exposed to the vehicle outer side. Moreover, because the cover transmits therethrough the detection medium that the detecting section of the peripheral information detecting sensor uses in detection, marring of the external appearance of the vehicle can be suppressed while it is made possible to detect peripheral information of the vehicle by the peripheral information detecting sensor. Further, as compared with a case in which the peripheral information detecting sensor is mounted to a front pillar, peripheral information can be detected over an even wider range.

A self-driving vehicle of a ninth aspect has: the sensor placement structure of any one of the first aspect through the eighth aspect; and a processor, coupled to the peripheral information detecting sensor, and that controls traveling of the vehicle based on the peripheral information about the periphery of the vehicle detected by the peripheral information detecting sensor.

In the self-driving vehicle of the ninth aspect, the detection accuracy of the peripheral information detecting sensor can be maintained, without marring the external appearance. Further, as compared with a structure in which the peripheral information detecting sensor is disposed on the roof of a vehicle, it is difficult to receive air resistance while traveling, and the aerodynamic performance of the vehicle can be improved.

As described above, the placement structure for a peripheral information detecting sensor of the first aspect has the excellent effect that the detection accuracy of the peripheral information detecting sensor can be maintained, without marring the external appearance of the vehicle.

The placement structure for a peripheral information detecting sensor of the second aspect has the excellent effect that electromagnetic noise is blocked, and the detection accuracy of the peripheral information detecting sensor can be maintained.

The placement structure for a peripheral information detecting sensor of the third aspect has the excellent effect that the design of the vehicle can be ensured.

The placement structure for a peripheral information detecting sensor of the fourth aspect has the excellent effect that the design of the vehicle can be improved.

The placement structure for a peripheral information detecting sensor of the fifth aspect has the excellent effect that an increase in the external dimensions of the vehicle due to the cover member can be suppressed.

The placement structure for a peripheral information detecting sensor of the sixth aspect has the excellent effect that, even in a case in which the vehicle is involved in a minor collision in the longitudinal direction, the mounted state of the peripheral information detecting sensor can be maintained.

The placement structure for a peripheral information detecting sensor of the seventh aspect has the excellent effect that peripheral information of the vehicle can be detected over a wide range.

The self-driving vehicle of the eight aspect has the excellent effects that the detection accuracy of the peripheral information detecting sensor can be maintained without the external appearance of the vehicle being marred, and a deterioration in the aerodynamic performance can be suppressed.

BRIEF DESCRIPTION OF THE DRAWINGS

Example embodiments will be described in detail based on the following figures, wherein.

DETAILED DESCRIPTION

First Embodiment

A self-driving vehicle, to which is applied a placement structure for a peripheral information detecting sensor relating to a first embodiment, is described hereinafter with reference to FIG. 1 through FIG. 3. Note that arrow FR that is shown appropriately in FIG. 1 indicates the vehicle front side of a self-driving vehicle at which the peripheral information detecting sensor is installed, arrow UP indicates the vehicle upper side, and arrow OUT indicates the vehicle transverse direction outer side. Further, in the following description, when longitudinal, vertical and left-right directions are used without being specified, they respectively mean the vehicle longitudinal direction, the vehicle vertical direction, and the left and right directions when facing in the advancing (forward-moving) direction.

Figure 1:
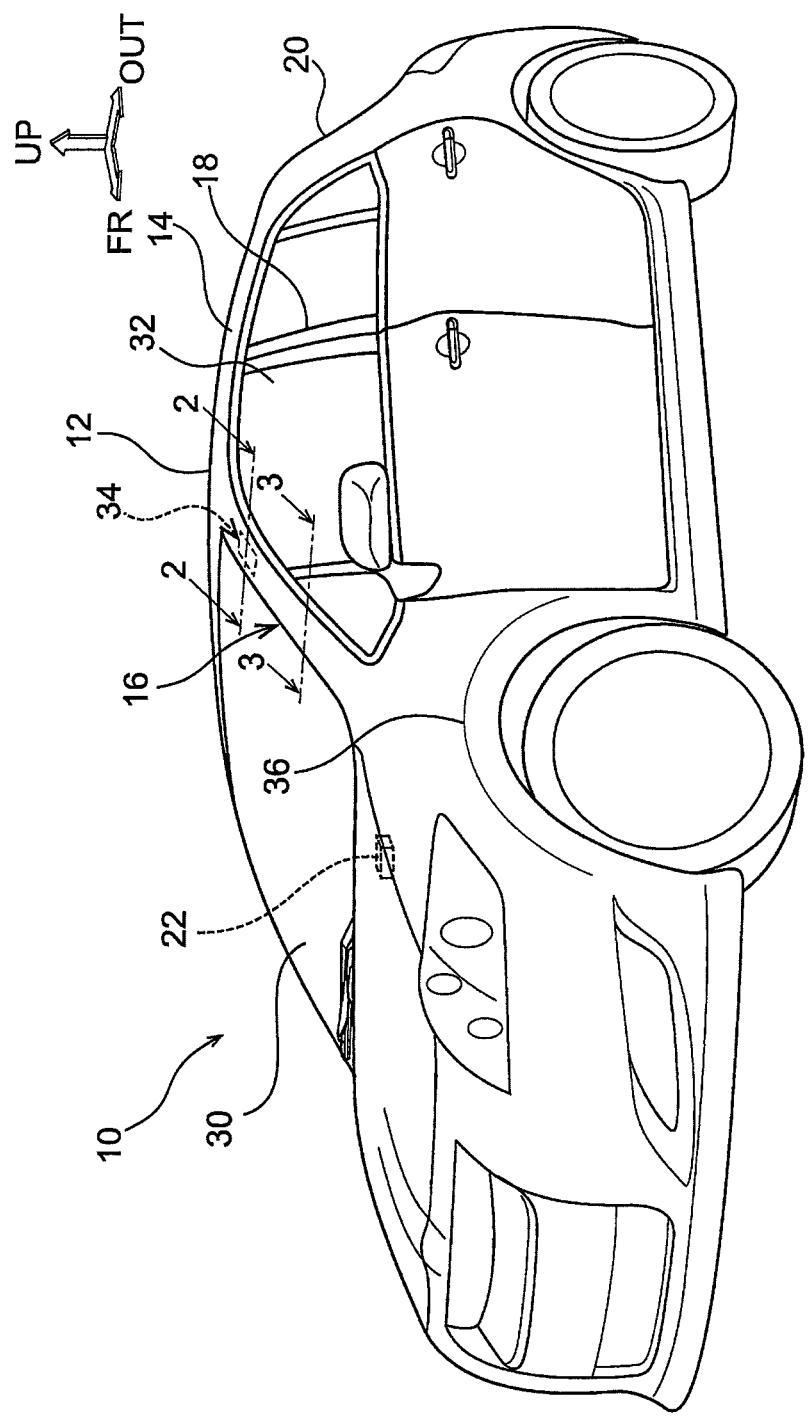
FIG. 1 is a perspective view showing a vehicle front portion of a vehicle in which a peripheral information detecting sensor relating to a first embodiment is installed.

As shown in FIG. 1, a roof panel 12 is disposed at the vehicle upper portion of a self-driving vehicle 10 (hereinafter simply called "vehicle 10"). Further, a pair of left and right roof side rails 14 are disposed at both sides of the roof panel 12 in the vehicle transverse direction.

The roof side rails 14 respectively extend in the vehicle longitudinal direction. An unillustrated front header and rear header span along the vehicle transverse direction between the pair of roof side rails 14. The front header spans between the front end portions of the roof side rails 14, and the rear header spans between the rear end portions of the roof side rails 14. Further, an unillustrated roof reinforcement spans along the vehicle transverse direction between the front header and the rear header.

Front pillars 16 that serve as vehicle skeleton members extend toward the vehicle lower side from the front end portions of the roof side rails 14. Further toward the vehicle rear side than the front pillars 16, center pillars 18 extend toward the vehicle lower side from the roof side rails 14. Moreover, further toward the vehicle rear side than the center pillars 18, rear pillars 20 extend toward the vehicle lower side from the roof side rails 14. The front pillars 16, the center pillars 18 and the rear pillars 20 are respectively provided as left-right pairs. A peripheral information detecting sensor 34 relating to the present embodiment is disposed at the upper portion of the front pillar 16.

Here, a controller 22, that serves as a control section that controls the traveling of the vehicle 10 on the basis of peripheral information detected by the peripheral information detecting sensor 34, is provided at the vehicle 10. Controller 22 can be a micro-computer having a central processing unit (CPU), ROM and RAM, for example. Further, the peripheral information detecting sensor 34 and the controller 22 are electrically connected. Therefore, the vehicle 10 is structured such that the vehicle 10 can be made to travel by the controller 22 without the vehicle 10 being driven by a driver. Note that the present embodiment is structured so as to be able to, on the basis of the peripheral information detected by the peripheral information detecting sensor 34, switch between a self-driving mode in which the controller 22 controls the traveling of the vehicle 10, and a manual driving mode in which a driver himself operates an unillustrated steering wheel and causes the vehicle 10 to travel.

(Placement Structure for Peripheral Information Detecting Sensor)

Figure 2:
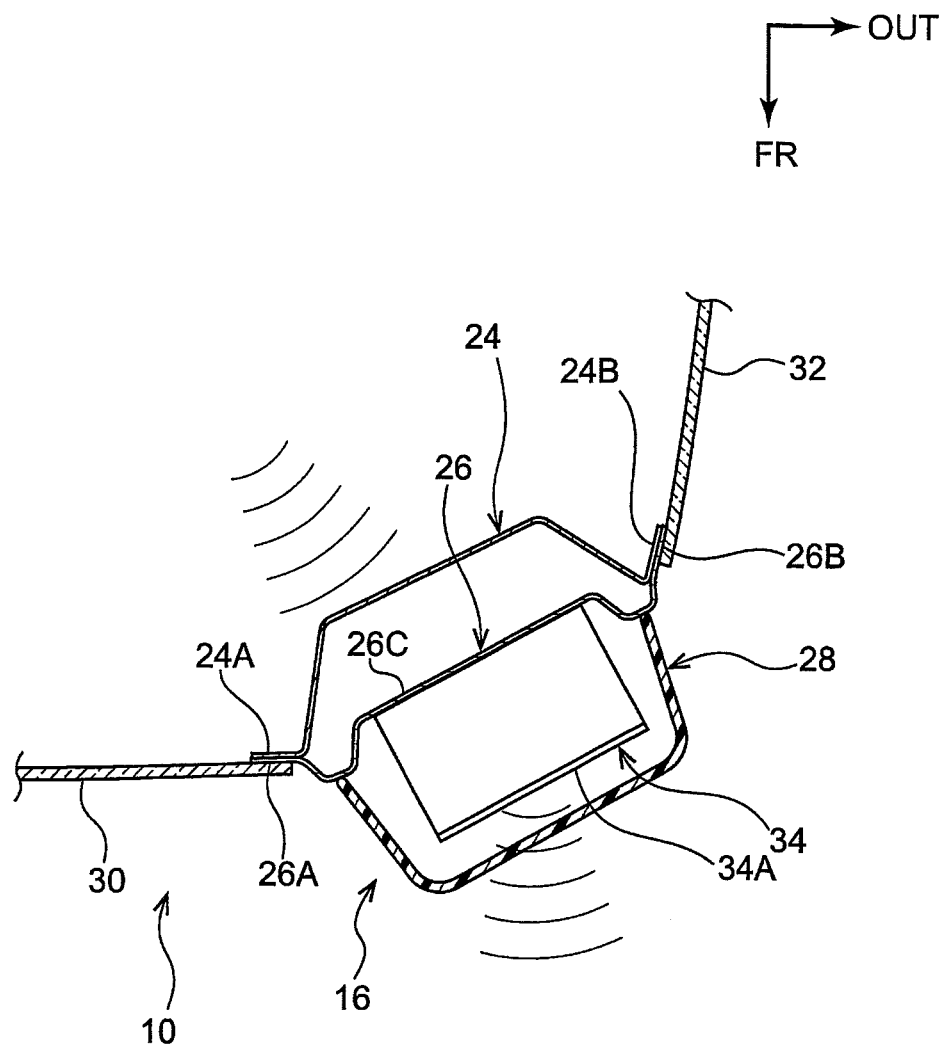
FIG. 2 is a cross-sectional view showing, in an enlarged manner, the state cut along line 2-2 of FIG. 1.

As shown in FIG. 2, the front pillar 16 is structured to include a front pillar inner panel 24 and a front pillar outer panel 26. The front pillar inner panel 24 is disposed at the vehicle inner side and extends in the vehicle vertical direction, and is formed from a member that is electrically conductive.

Further, the cross-section, that is cut longitudinally along the vehicle transverse direction, of the front pillar inner panel 24 is formed in a substantial hat shape that opens toward the vehicle front side and the vehicle transverse direction outer side. An inner side inner flange 24A extends along a windshield glass 30 from the vehicle transverse direction inner side end portion of the front pillar inner panel 24. An inner side outer flange 24B extends along a front side glass 32 from the vehicle transverse direction outer side end portion of the front pillar inner panel 24.

The front pillar outer panel 26 is disposed further toward the vehicle outer side than the front pillar inner panel 24. The front pillar outer panel 26 extends in the vehicle vertical direction, and is formed from a member that is electrically conductive. A closed cross-section (a hollow chamber) is structured by the front pillar outer panel 26 and the front pillar inner panel 24. Moreover, an outer side inner flange 26A extends along the windshield glass 30 at the vehicle transverse direction inner side end portion of the front pillar outer panel 26. The outer side inner flange 26A and the inner side inner flange 24A are joined by welding or the like. Further, the outer edge portion of the windshield glass 30 is mounted to the vehicle outer side of the outer side inner flange 26A.

On the other hand, an outer side outer flange 26B extends along the front side glass 32 at the vehicle transverse direction outer side end portion of the front pillar outer panel 26. The outer side outer flange 26B and the inner side outer flange 24B are joined by welding or the like. Further, the outer edge portion of the front side glass 32 is mounted to the vehicle outer side of the outer side outer flange 26B.

Here, a sensor mounting portion 26C is formed between the outer side inner flange 26A and the outer side outer flange 26B at the front pillar outer panel 26. The sensor mounting portion 26C is formed by the transverse direction middle portion of the front pillar outer panel 26 being recessed toward the vehicle inner side. The peripheral information detecting sensor 34 is mounted, by unillustrated fasteners such as bolts or the like, to the vehicle outer side surface of this sensor mounting portion 26C. Note that, at the general portion of the front pillar outer panel 26 (the region to which the peripheral information detecting sensor 34 is not mounted), the cross-section that is cut longitudinally along the vehicle transverse direction is formed in a substantial hat shape that opens toward the vehicle rear side and the vehicle transverse direction inner side.

The peripheral information detecting sensor 34 that is mounted to the sensor mounting portion 26C has a detecting section 34A. The detecting section 34A is provided at the vehicle outer side of the peripheral information detecting sensor 34. The peripheral information detecting sensor 34 is structured so as to be able to detect peripheral information by this detecting section 34A. Note that, in the present embodiment, as an example, a millimeter wave radar is used as the peripheral information detecting sensor 34, and a radio wave transmitting section and receiving section are the detecting section 34A, but the peripheral information detecting sensor 34 is not limited to this. For example, a laser radar, an ultrasonic wave sensor, an optical camera or the like may be used, or another sensor may be used. Further, in a case in which a laser radar is used as the peripheral information detecting sensor 34, a laser light light-emitting section and light-receiving section are the detecting section. Further, in a case in which an ultrasonic wave sensor is used as the peripheral information detecting sensor 34, a transmitter and receiver are the detecting section. Moreover, in a case in which an optical camera is used as the peripheral information detecting sensor 34, a visible light light-receiving section is the detecting section.

A front pillar garnish 28 (hereinafter simply called "pillar garnish 28") that serves as a cover is disposed further toward the vehicle outer side than the peripheral information detecting sensor 34. The cross-section, that is cut longitudinally along the vehicle transverse direction, of the pillar garnish 28 is formed in a substantial U-shape that opens toward the vehicle rear side and the vehicle transverse direction inner side. Further, the vehicle transverse direction inner side end portion of the pillar garnish 28 extends toward the vehicle rear side, and is joined between the sensor mounting portion 26C and the outer side inner flange 26A. Further, the vehicle transverse direction outer side end portion of the pillar garnish 28 extends toward the vehicle rear side, and is joined between the sensor mounting portion 26C and the outer side outer flange 26B. In this way, the pillar garnish 28 covers the peripheral information detecting sensor 34 from the vehicle outer side.

Here, the pillar garnish 28 is formed from a material that transmits therethrough the detection medium that the detecting section 34A of the peripheral information detecting sensor 34 detects. Note that, in the present embodiment, a millimeter wave radar is used as the peripheral information detecting sensor 34, and the pillar garnish 28 is formed from an opaque resin material through which radio waves are transmitted. Further, in the present embodiment, the pillar garnish 28 is made to be the same color as the body of the vehicle 10. In addition, in a case in which a laser radar or an optical camera is used as the peripheral information detecting sensor 34, the pillar garnish 28 may be formed from a transparent resin material, or the like, that transmits laser light or visible light therethrough. Further, in a case in which an ultrasonic wave sensor is used as the peripheral information detecting sensor 34, the pillar garnish 28 may be formed of a material that transmits ultrasonic waves therethrough.

Figure 3:
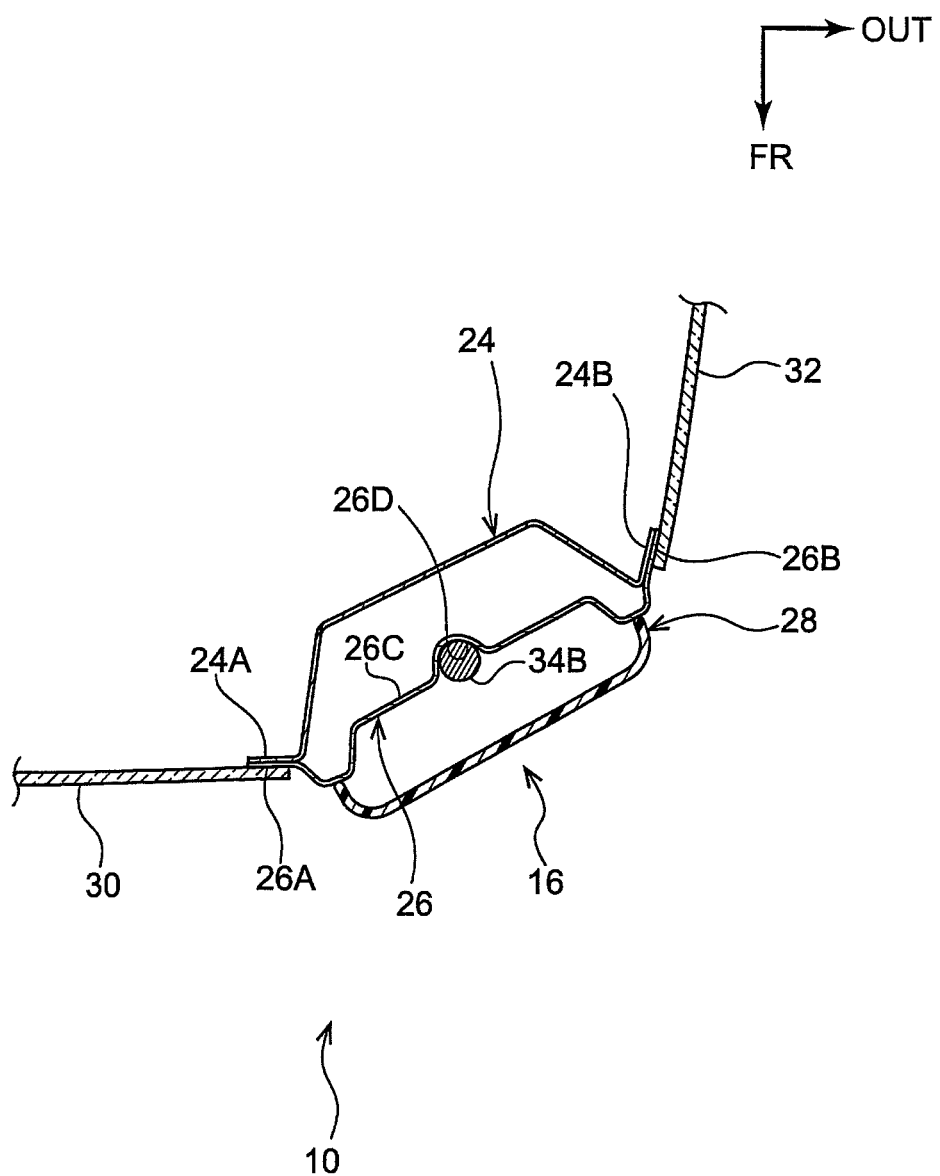
FIG. 3 is a cross-sectional view showing, in an enlarged manner, the state cut along line 3-3 of FIG. 1.

As shown in FIG. 3, a wire harness 34B extends from the peripheral information detecting sensor 34 along the front pillar 16. This wire harness 34B is connected to the controller 22 (see FIG. 1). Here, a guide groove 26D is formed in the front pillar outer panel 26 by recessing the vehicle transverse direction central portion of the sensor mounting portion 26C toward the vehicle inner side. Then, the wire harness 34B is placed in this guide groove 26D.

(Operation and Effects)

Operation and effects of the vehicle 10, that is equipped with the peripheral information detecting sensor 34 relating to the present embodiment, are described next. In the present embodiment, as shown in FIG. 1, the peripheral information detecting sensor 34 is provided at the vehicle outer side of the front pillar 16. The vehicle 10 is made to travel on the basis of peripheral information that this peripheral information detecting sensor 34 detects. Concretely, as shown in FIG. 2, in the present embodiment, the peripheral information detecting sensor 34 is mounted to the vehicle outer side of the sensor mounting portion 26C of the front pillar outer panel 26, and the detecting section 34A is provided at this peripheral information detecting sensor 34. Further, peripheral information of the vehicle 10 is detected by this detecting section 34A, and the peripheral information is transmitted to the controller 22 via the wire harness 34B. In this way, the controller 22 controls the traveling of the vehicle on the basis of the peripheral information acquired from the peripheral information detecting sensor 34.

Here, the peripheral information detecting sensor 34 is mounted to the vehicle outer side of the front pillar 16 that has a closed cross-sectional structure (it defines a hollow chamber) that is structured by the front pillar inner panel 24 and the front pillar outer panel 26. Due thereto, the mounting rigidity can be ensured, and, even at times when the vehicle 10 is traveling, vibration of the peripheral information detecting sensor 34 can be suppressed. As a result, the detection accuracy of the peripheral information detecting sensor 34 can be maintained. Further, in the present embodiment, because the peripheral information detecting sensor 34 is disposed at the upper portion of the front pillar 16, peripheral information of the vehicle 10 can be detected from the same position as the eye line of a passenger or from a position that is higher than the eye line of a passenger. Due thereto, peripheral information of the vehicle 10 can be detected over a wide range as compared with a structure in which the peripheral information detecting sensor 34 is disposed at the lower portion of the vehicle 10.

Moreover, the peripheral information detecting sensor 34 is covered from the vehicle outer side by the pillar garnish 28. Due thereto, a deterioration in the aerodynamic performance can be suppressed. Namely, in a structure in which a device that detects peripheral information is mounted on the roof panel 12 of the vehicle 10, air resistance is created by the device, and therefore, there are cases in which the aerodynamic performance of the vehicle deteriorates. In contrast, in the present embodiment, by covering the peripheral information detecting sensor 34 from the vehicle outer side by the pillar garnish 28, the air resistance created by the peripheral information detecting sensor 34 at times of traveling is decreased, and a deterioration in the aerodynamic performance can be suppressed. Further, because the peripheral information detecting sensor 34 is not exposed to the vehicle outer side, it is difficult for the peripheral information detecting sensor 34 to be seen from the vehicle outer side. Due thereto, the design of the vehicle 10 can be ensured without the external appearance of the vehicle 10 being marred.

In particular, in the present embodiment, the pillar garnish 28 is formed from an opaque resin material, and the pillar garnish 28 that is the same color as the body of the vehicle 10 is used. Due thereto, the color of the vehicle 10 is made uniform, and a sense of incongruity with regard to the pillar garnish 28 can be eliminated. As a result, the design of the vehicle 10 can be improved, while detection of peripheral information by the peripheral information detecting sensor 34 is made possible.

Further, in the present embodiment, the front pillar 16 is structured by the front pillar inner panel 24 and the front pillar outer panel 26 that are electrically conductive. The peripheral information detecting sensor 34 is mounted to the vehicle outer side of this front pillar 16. Due thereto, the peripheral information detecting sensor 34 being affected by electromagnetic noise that is generated at the vehicle inner side can be suppressed. Concretely, there are cases in which the peripheral information detecting sensor 34 is affected by electromagnetic waves (electromagnetic noise) that is generated from audio equipment or switches or the like at the vehicle inner side. Here, in the present embodiment, among the electromagnetic waves that are generated from the vehicle inner side, the electromagnetic waves that are directed toward the peripheral information detecting sensor 34 are blocked by the front pillar 16, and therefore, the peripheral information detecting sensor 34 being affected by electromagnetic noise from the vehicle inner side can be suppressed. Namely, there is a structure in which electromagnetic noise that is generated from the vehicle inner side is blocked by the front pillar 16, and the detection medium that the peripheral information detecting sensor 34 detects is transmitted through the pillar garnish 28. In this way, the detection accuracy of the peripheral information detecting sensor 34 can be maintained.

Further, in the present embodiment, as shown in FIG. 3, the guide groove 26D is formed in the front pillar outer panel 26, and the wire harness 34B is placed in this guide groove 26D. Due thereto, a portion of the outer peripheral surface of the wire harness 34B is surrounded by the front pillar outer panel 26 that is electrically conductive, and the wire harness 34B being affected by electromagnetic noise from the vehicle inner side can be suppressed. Further, by forming the guide groove 26D, the amount by which the wire harness 34B projects-out toward the vehicle outer side can be suppressed, as compared with a structure in which the guide groove 26D is not formed in the front pillar outer panel 26. Due thereto, the gap between the front pillar outer panel 26 and the pillar garnish 28 can be made to be small, and the field of view of a passenger can be ensured.

Note that, in the present embodiment, the guide groove 26D is formed in the sensor mounting portion 26C of the front pillar outer panel 26, but the present embodiment is not limited to this. For example, the region of the front pillar outer panel 26, at which region the wire harness 34B is disposed, may be made to be a substantial hat shape in cross-section in the same way as the general portion is, and the guide groove 26D may be formed in this region of the front pillar outer panel 26. In this case, the cross-sectional surface area of the closed cross-section that is formed by the front pillar inner panel 24 and the front pillar outer panel 26 increases by an amount corresponding to the sensor mounting portion 26C not being formed. Due thereto, the rigidity of the front pillar 16 can be increased. Further, by placing the wire harness 34B within the guide groove 26D, the gap between the front pillar outer panel 26 and the pillar garnish 28 is made small and the field of view of a passenger can be ensured, while the rigidity of the front pillar 16 is increased.

Second Embodiment

A self-driving vehicle, to which is applied a placement structure for a peripheral information detecting sensor relating to a second embodiment, is described next with reference to FIG. 4. Note that structures that are similar to those of the first embodiment are denoted by the same reference numerals, and description thereof is omitted.

Figure 4:
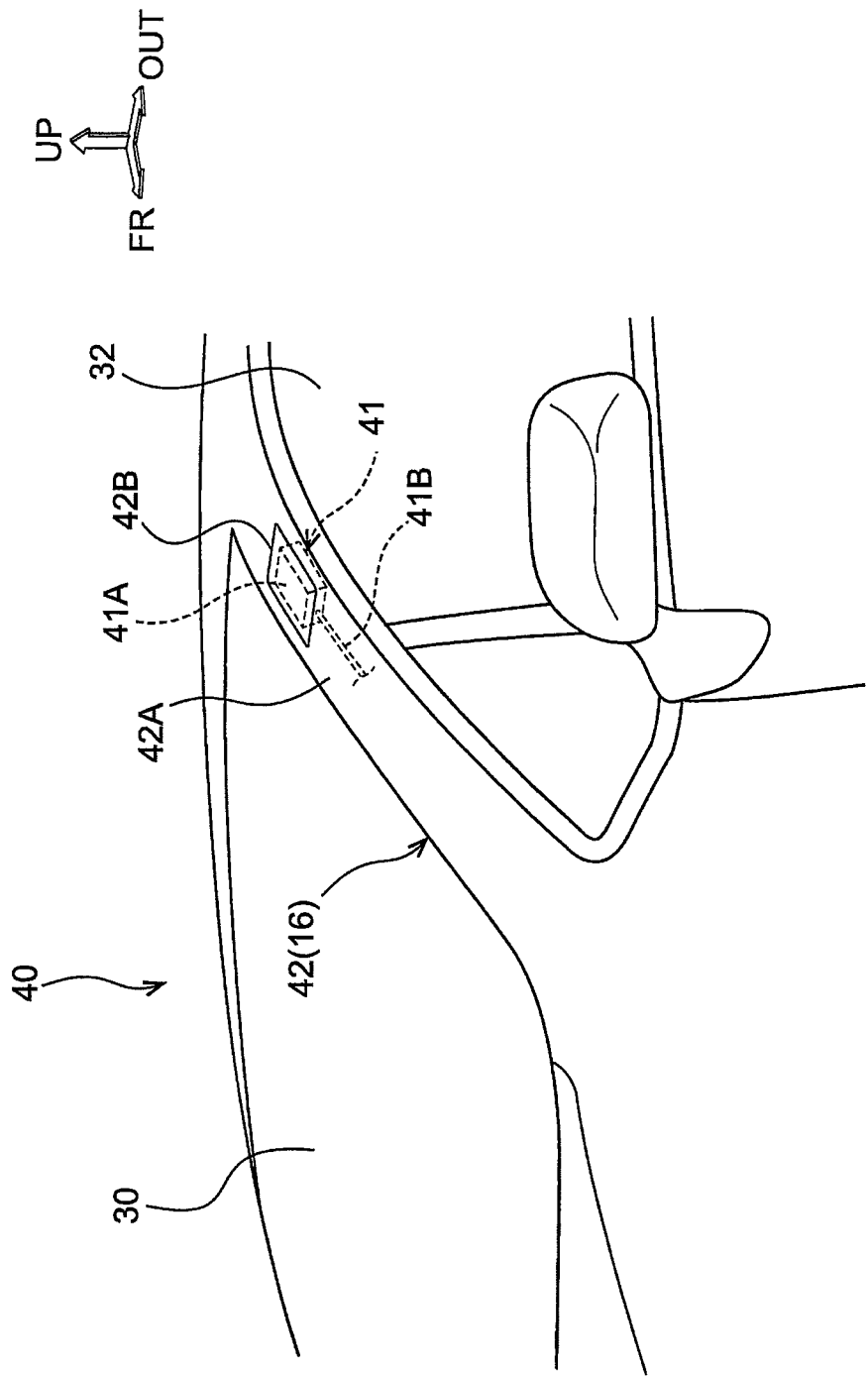
FIG. 4 is a perspective view showing, in an enlarged manner, a front pillar of a vehicle in which a peripheral information detecting sensor relating to a second embodiment is installed.

As shown in FIG. 4, a peripheral information detecting sensor 41 relating to the present embodiment is disposed at the upper portion of the front pillar 16 of a self-driving vehicle 40 (hereinafter simply called "vehicle 40"). Concretely, the peripheral information detecting sensor 41 is disposed at the vehicle outer side of the front pillar 16 that is a closed cross-sectional structure, and, in the same way as in the first embodiment, the peripheral information detecting sensor 41 is mounted to the sensor mounting portion 26C of the front pillar outer panel 26 (see FIG. 2) by unillustrated fasteners such as bolts or the like. Further, the peripheral information detecting sensor 41 has a detecting section 41A that detects peripheral information of the vehicle 40. Moreover, a wire harness 41B is disposed along the front pillar 16 extending from the peripheral information detecting sensor 41.

A front pillar garnish 42 (hereinafter simply called "pillar garnish 42") is disposed along the front pillar 16, further toward the vehicle outer side than the front pillar 16. The pillar garnish 42 is structured to include a garnish main body 42A, and a transmission member 42B that serves as a cover. The garnish main body 42A is formed of metal, and extends in the vehicle vertical direction along the end portion of the windshield glass 30. Further, the region of the garnish main body 42A, which region faces the peripheral information detecting sensor 41, is cut-out in a substantially rectangular shape, and the transmission member 42B is mounted to this cut-out region.

The transmission member 42B is disposed so as to cover the peripheral information detecting sensor 41 from the vehicle outer side. Further, the transmission member 42B is formed from a material that transmits therethrough the detection medium that the detecting section 41A of the peripheral information detecting sensor 41 detects. In the present embodiment, the transmission member 42B is formed from an opaque resin material. Further, the garnish main body 42A and the transmission member 42B are made to be the same color as the body of the vehicle 40.

(Operation and Effects)

Operation and effects of the vehicle 40 that is equipped with the peripheral information detecting sensor 41 relating to the present embodiment are described next. In the present embodiment, the peripheral information detecting sensor 41 is mounted to the vehicle outer side of the front pillar 16 that has a closed cross-sectional structure. Due thereto, the mounting rigidity can be ensured, and, even at times when the vehicle 40 is traveling, vibration of the peripheral information detecting sensor 41 can be suppressed. As a result, the detection accuracy of the peripheral information detecting sensor 41 can be maintained.

Further, in the present embodiment, the region, that faces the peripheral information detecting sensor 41, of the pillar garnish 42 is formed by the transmission member 42B. Due thereto, the detection medium that the detecting section 41A of the peripheral information detecting sensor 41 detects can be transmitted through, and the detection accuracy of the peripheral information detecting sensor 41 can be ensured.

Further, the transmission member 42B is formed from an opaque resin material, and is the same color as garnish main body 42A. Due thereto, the transmission member 42B is inconspicuous, and a deterioration in the design can be suppressed. Moreover, because the transmission member 42B and the garnish main body 42A are made to be the same color as the body of the vehicle 40, the color of the vehicle 40 is made uniform, and a sense of incongruity with regard to the pillar garnish 42 can be eliminated.

Further, in the present embodiment, because the garnish main body 42A is formed of metal, the strength and rigidity of the front pillar 16 can be increased. Moreover, the garnish main body 42A that is made of metal is disposed further toward the vehicle outer side than the wire harness 41B. Further, the front pillar inner panel 24 that is electrically conductive and the front pillar outer panel 26 that is electrically conductive are disposed at the vehicle inner side of the wire harness 41B. Due thereto, electromagnetic waves that are directed from the vehicle inner side toward the wire harness 41B are blocked by the front pillar inner panel 24 and the front pillar outer panel 26, and the electromagnetic waves that are directed from the vehicle outer side toward the wire harness 41B are blocked by the garnish main body 42A. As a result, the wire harness 41B being affected by electromagnetic noise can be suppressed. The other operations are similar to those of the first embodiment.

Note that, in the present embodiment, the transmission member 42B of the pillar garnish 42 is formed of an opaque resin material, but the present embodiment is not limited to this. For example, the transmission member 42B may be formed from a transparent resin material, or may be formed of a material other than resin. Further, although the garnish main body 42A is formed of metal in the present embodiment, the present embodiment is not limited to this. For example, the garnish main body 42A may be formed of a fiber reinforced resin, or the like.

Third Embodiment

A self-driving vehicle, to which is applied a placement structure for a peripheral information detecting sensor relating to a third embodiment, is described next with reference to FIG. 5 and FIG. 6. Note that structures that are similar to those of the first embodiment are denoted by the same reference numerals, and description thereof is omitted.

Figure 5:
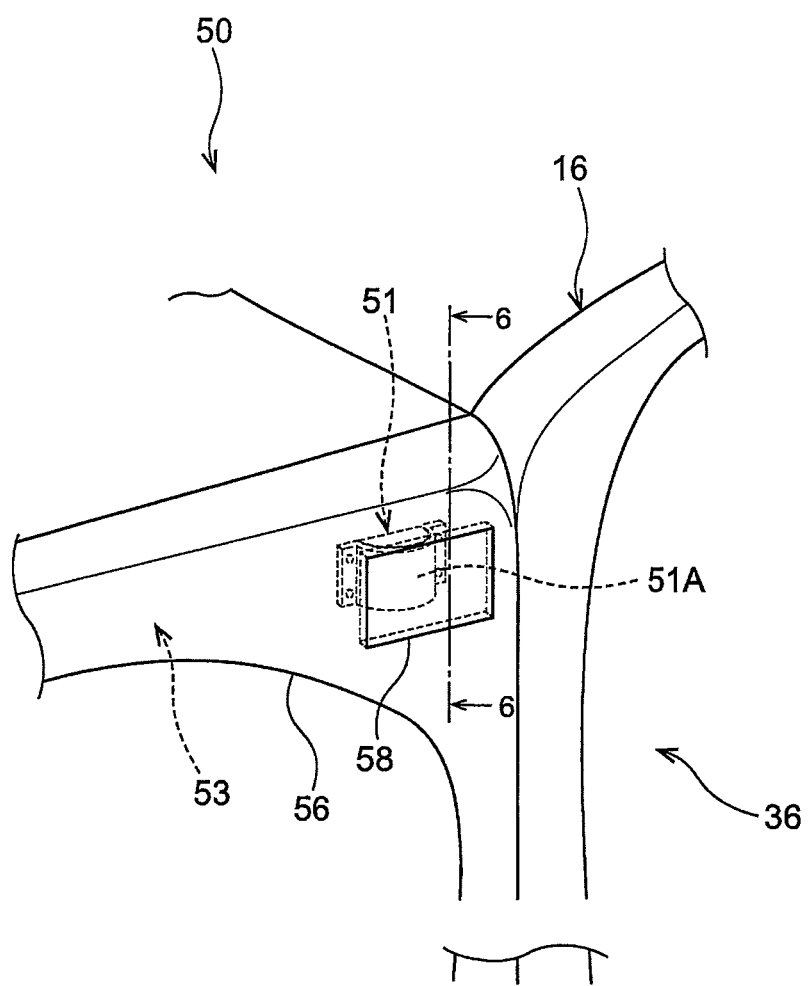
FIG. 5 is a perspective view showing, in an enlarged manner, a front fender of a vehicle in which a peripheral information detecting sensor relating to a third embodiment is installed.

As shown in FIG. 5, a peripheral information detecting sensor 51 relating to the present embodiment is disposed at the vehicle inner side of a fender 36 of a self-driving vehicle 50 (hereinafter simply called "vehicle 50"). Concretely, the peripheral information detecting sensor 51 is mounted to the vehicle outer side of an apron upper member 53 that serves as a vehicle skeleton member and that extends-out toward the vehicle front side from the lower end portion of the front pillar 16.

Figure 6:
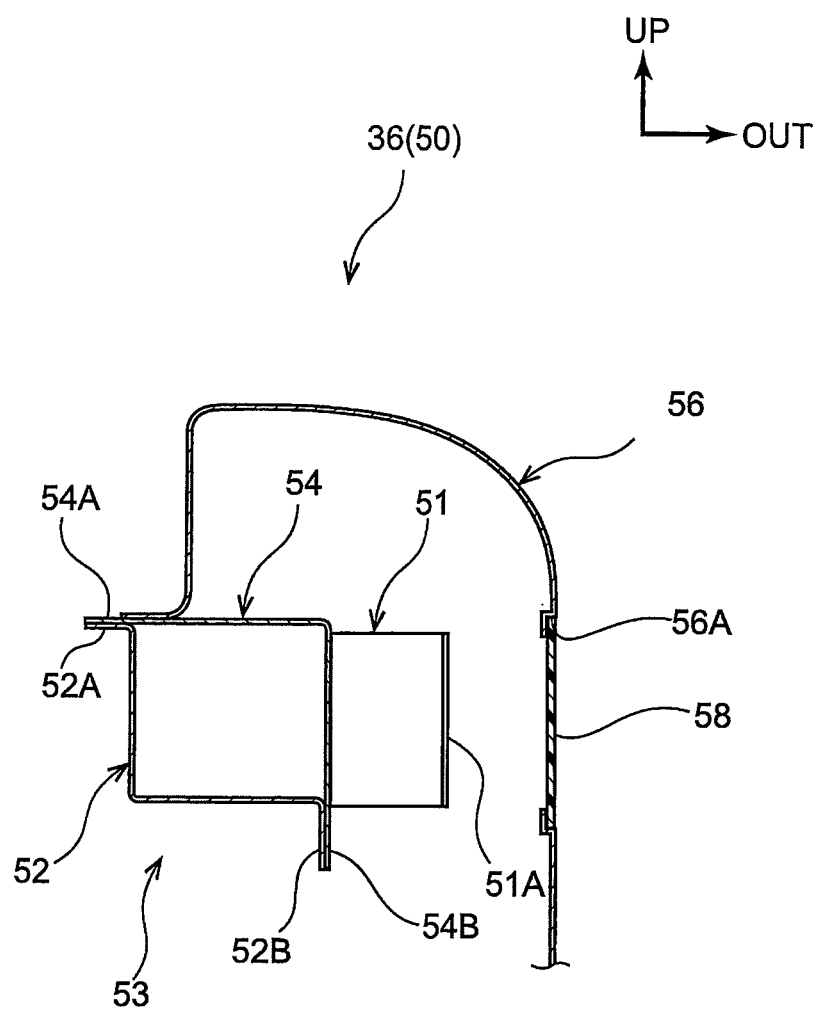
FIG. 6 is a cross-sectional view showing, in an enlarged manner, the state cut along line 6-6 of FIG. 5.

As shown in FIG. 6, the apron upper member 53 includes an apron upper member inner 52 and an apron upper member outer 54, and is structured as a closed cross-section (a hollow chamber). The apron upper member inner 52 is disposed at the vehicle inner side, and the cross-section thereof, that is cut vertically along the vehicle transverse direction, is formed in a substantial L-shape. Further, an inner side inner flange 52A extends toward the vehicle transverse direction inner side from the upper end portion of the apron upper member inner 52. Moreover, an inner side outer flange 52B extends toward the vehicle lower side from the vehicle transverse direction outer side end portion of the apron upper member inner 52.

On the other hand, the apron upper member outer 54 is disposed further toward the vehicle outer side than the apron upper member inner 52, and the cross-section thereof, that is cut vertically along the vehicle transverse direction, is formed in a substantial upside-down L-shape. Further, an outer side inner flange 54A extends toward the vehicle transverse direction inner side from the vehicle transverse direction inner side end portion of the apron upper member outer 54, and this outer side inner flange 54A is joined to the inner side inner flange 52A by welding or the like. Further, an outer side outer flange 54B extends toward the vehicle lower side from the lower end portion of the apron upper member outer 54, and this outer side outer flange 54B is joined to the inner side outer flange 52B by welding or the like. In this way, the apron upper member 53 is a closed cross-sectional structure.

Here, the peripheral information detecting sensor 51 is mounted to the vehicle transverse direction outer side of the apron upper member outer 54, by unillustrated fasteners such as bolts or the like. Further, the peripheral information detecting sensor 51 has a detecting section 51A that detects peripheral information of the vehicle 50.

A front fender panel 56 is disposed further toward the vehicle outer side than the peripheral information detecting sensor 51. The upper end portion of the front fender panel 56 is bent toward the vehicle transverse direction inner side, and the vehicle transverse direction inner side end portion of the front fender panel 56 extends toward the vehicle lower side toward the apron upper member 53. Further, the front fender panel 56 extends toward the vehicle transverse direction inner side, and is joined to the apron upper member outer 54 by welding or via an impact absorbing bracket.

Further, an opening 56A that is substantially rectangular is formed in the region, that faces the peripheral information detecting sensor 51 in the vehicle transverse direction, of the front fender panel 56. A transmission member 58, that serves as a cover and that covers the peripheral information detecting sensor 51 from the vehicle outer side, is mounted to this opening portion 56A. Here, the transmission member 58 is formed of a material that transmits therethrough the detection medium that the detecting section 51A of the peripheral information detecting sensor 51 detects, and, in the present embodiment, the transmission member 58 is formed from an opaque resin material. Further, the front fender panel 56 and the transmission member 58 are made to be the same color as the body of the vehicle 50.

(Operation and Effects)

Operation and effects of the vehicle 50, that is equipped with the peripheral information detecting sensor 51 relating to the present embodiment, are described next. In the present embodiment, the peripheral information detecting sensor 51 is mounted to the vehicle outer side of the apron upper member 53 that is a closed cross-sectional structure. Due thereto, the mounting rigidity can be ensured, and, even at times when the vehicle 50 is traveling, vibration of the peripheral information detecting sensor 51 can be suppressed. As a result, the detection accuracy of the peripheral information detecting sensor 51 can be maintained.

Further, in the present embodiment, the region, that faces the peripheral information detecting sensor 51, of the front fender panel 56 is formed by the transmission member 58. Due thereto, the detection medium that the detecting section 51A of the peripheral information detecting sensor 51 detects can be transmitted through, and the detection accuracy of the peripheral information detecting sensor 51 can be ensured.

Further, the transmission member 58 is formed from an opaque resin material, and is the same color as the front fender panel 56. Due thereto, the transmission member 58 is inconspicuous, and a deterioration in the design can be suppressed. Moreover, because the transmission member 58 and the front fender panel 56, and the body of the vehicle 50, are made to be the same color, the color of the vehicle 50 is made uniform, and a sense of incongruity with regard to the front fender panel 56 can be eliminated.

Further, in the present embodiment, because the peripheral information detecting sensor 51 is disposed in the space between the front fender panel 56 and the apron upper member 53, the space for placement can be ensured to be large as compared with a structure in which the peripheral information detecting sensor 51 is disposed at the inner side of the front pillar 16. Due thereto, even in a case in which the peripheral information detecting sensor 51 is large-sized, the front fender panel 56 does not have to be bulged-out toward the vehicle transverse direction outer side, and the design of the vehicle 50 can be ensured.

Moreover, by placing the peripheral information detecting sensor 51 at the fender 36 that is near to the vehicle cabin space, even in a case in which the vehicle 50 is involved in a minor collision in the longitudinal direction, the mounted state of the peripheral information detecting sensor 51 can be maintained. Further, information of the lower side of the vehicle side portion, that is a dead angle to occupants, can be detected. Other operations are similar to those of the first embodiment.

Note that, in the present embodiment, the transmission member 58 that serves as a cover is provided at the front fender panel 56, but the present embodiment is not limited to this. For example, the entire front fender panel 56 may be formed of a material that is similar to that of the transmission member 58. By doing so, the transmission member 58 is rendered unnecessary, and the number of parts can be reduced. Further, in the present embodiment, the peripheral information detecting sensor 51 is disposed at the vehicle inner side of the front fender panel 56, but the present embodiment is not limited to this. For example, the peripheral information detecting sensor may be disposed at the vehicle inner side of a rear fender panel.

Fourth Embodiment

A self-driving vehicle, to which is applied a placement structure for a peripheral information detecting sensor relating to a fourth embodiment, is described next with reference to FIG. 7 and FIG. 8. Note that structures that are similar to those of the first embodiment are denoted by the same reference numerals, and description thereof is omitted.

Figure 7:
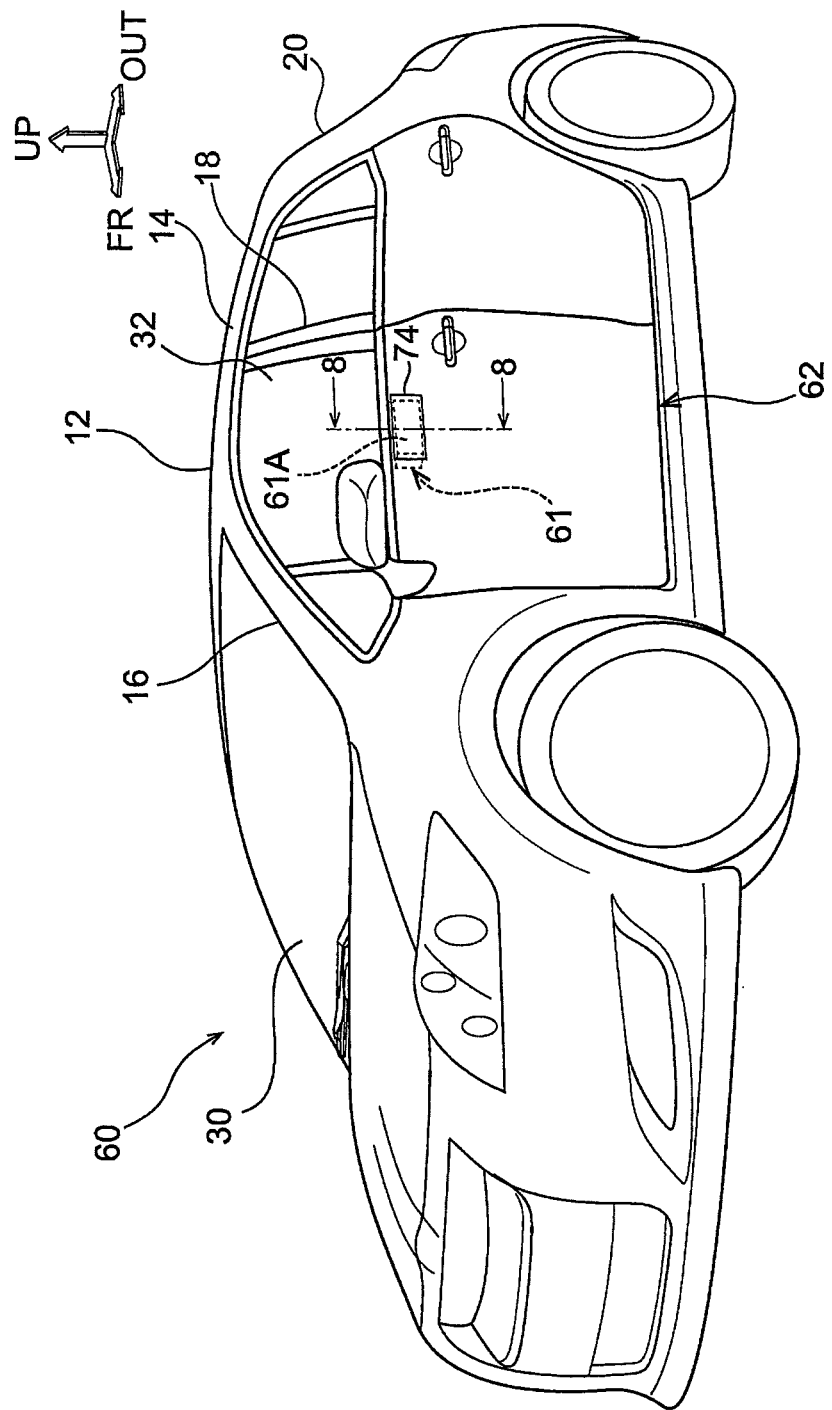
FIG. 7 is a side view showing a front side door of a vehicle in which a peripheral information detecting sensor relating to a fourth embodiment is installed.

As shown in FIG. 7, a peripheral information detecting sensor 61 relating to the present embodiment is disposed at the interior of a front side door 62 of a self-driving vehicle 60 (hereinafter simply called "vehicle 60").

Figure 8:
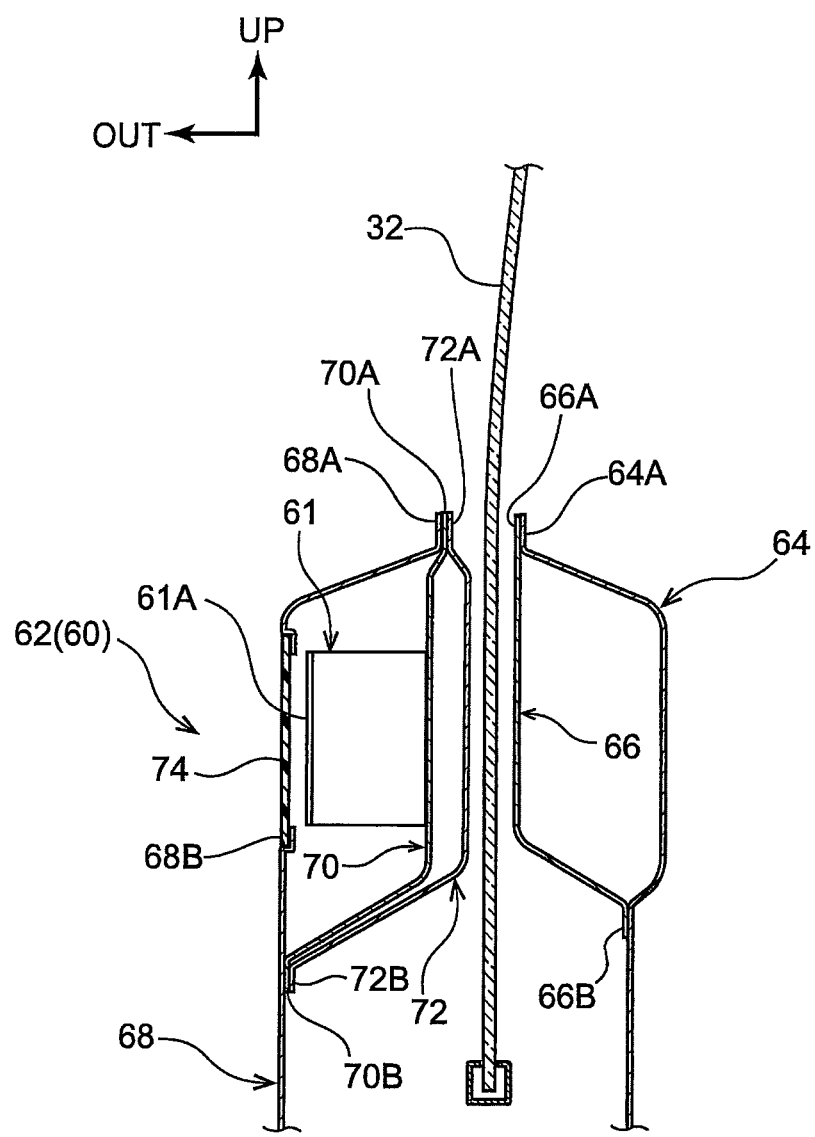
FIG. 8 is a cross-sectional view showing, in an enlarged manner, the state cut along line 8-8 of FIG. 7.

As shown in FIG. 8, the front side door 62 is structured to include a door inner panel 64 and a door outer panel 68.

The front side glass 32 is disposed between the door inner panel 64 and the door outer panel 68.

The door inner panel 64 is disposed at the vehicle inner side, and structures the inner plate of the front side door 62. A belt line inner reinforcement 66 (hereinafter simply called "inner RF 66") is disposed at the vehicle outer side of the upper end portion of the door inner panel 64. The inner RF 66 extends in the vehicle longitudinal direction along the door belt line, and an upper flange 66A extends toward the vehicle upper side at the upper end portion of the inner RF 66. Further, the upper flange 66A is joined by welding or the like to an inner side upper flange 64A that is formed at the upper end portion of the door inner panel 64. A lower flange 66B extends toward the vehicle lower side at the lower end portion of the inner RF 66. The lower flange 66B is joined to a region, that is lower than the inner side upper flange 64A, of the door inner panel 64. In this way, a closed cross-section (a hollow chamber) is structured by the door inner panel 64 and the inner RF 66.

On the other hand, the door outer panel 68 is disposed at the vehicle outer side, and structures the outer plate of the front side door 62. A first belt line outer reinforcement 70 (hereinafter simply called "first outer RF 70") is disposed at the vehicle inner side of the upper end portion of the door outer panel 68. The first outer RF 70 extends in the vehicle longitudinal direction along the door belt line, and an upper flange 70A extends toward the vehicle upper side at the upper end portion of the first outer RF 70. Further, the upper flange 70A is joined by welding or the like to an outer side upper flange 68A that is formed at the upper end portion of the door outer panel 68. A lower flange 70B extends toward the vehicle lower side at the lower end portion of the first outer RF 70. The lower flange 70B is joined to a region, that is lower than the outer side upper flange 68A, of the door outer panel 68. In this way, a closed cross-section (a hollow chamber) is structured by the door outer panel 68 and the first outer RF 70.

Further, a second belt line outer reinforcement 72 (hereinafter simply called "second outer RF 72") is disposed at the vehicle inner side of the first outer RF 70. The second outer RF 72 extends in the vehicle longitudinal direction along the door belt line, and an upper flange 72A extends toward the vehicle upper side at the upper end portion of the second outer RF 72. Further, the upper flange 72A is joined by welding or the like to the outer side upper flange 68A and the upper flange 70A. A lower flange 72B extends toward the vehicle lower side at the lower end portion of the second outer RF 72. The lower flange 72B is joined, together with the lower flange 70B, to a region, that is lower than the outer side upper flange 68A, of the door outer panel 68. In this way, a closed cross-section (a hollow chamber) is structured by the first outer RF 70 and the second outer RF 72. Further, the peripheral information detecting sensor 61 is mounted to the vehicle outer side of the first outer RF 70 by unillustrated fasteners such as bolts or the like. Namely, the peripheral information detecting sensor 61 is mounted to the vehicle outer side of a vehicle skeleton member that has a closed cross-sectional structure that is structured by the first outer RF 70 and the second outer RF 72.

The peripheral information detecting sensor 61 has a detecting section 61A that detects peripheral information of the vehicle 60. Here, an opening portion 68B is formed at a region, that faces the peripheral information detecting sensor 61, of the door outer panel 68. Further, a transmission member 74, that serves as a cover that covers the peripheral information detecting sensor 61 from the vehicle outer side, is mounted to this opening portion 68B. The transmission member 74 is formed from a material that transmits therethrough the detection medium that the detecting section 61A of the peripheral information detecting sensor 61 detects. In the present embodiment, the transmission member 74 is formed of an opaque resin material. Further, the transmission member 74 is made to be the same color as the door outer panel 68.

(Operation and Effects)

Operation and effects of the vehicle 60, that is equipped with the peripheral information detecting sensor 61 relating to the present embodiment, are described next. In the present embodiment, the peripheral information detecting sensor 61 is mounted to the vehicle outer side of the closed cross-sectional structure that is structured by the first outer RF 70 and the second outer RF 72. Due thereto, the mounting rigidity can be ensured, and, even at times when the vehicle 60 is traveling, vibration of the peripheral information detecting sensor 61 can be suppressed. As a result, the detection accuracy of the peripheral information detecting sensor 61 can be maintained.

Further, in the present embodiment, the region, that faces the peripheral information detecting sensor 61, of the door outer panel 68 is formed by the transmission member 74. Due thereto, the detection medium that the detecting section 61A of the peripheral information detecting sensor 61 detects can be transmitted through, and the detection accuracy of the peripheral information detecting sensor 61 can be ensured.

Further, the transmission member 74 is formed from an opaque resin material, and is the same color as the door outer panel 68. Due thereto, the transmission member 74 is inconspicuous, and a deterioration in the design can be suppressed. Moreover, by placing the peripheral information detecting sensor 61 at the front side door 62, peripheral information at the dead angle region of an occupant can be detected effectively. Other operations are similar to those of the first embodiment.

Note that, in the present embodiment, the transmission member 74 that serves as a cover is provided at the door outer panel 68, but the present embodiment is not limited to this. For example, the entire door outer panel 68 may be formed of a material that is similar to that of the transmission member 74, and by a member that has rigidity of the same extent as the door outer panel 68. By doing so, the transmission member 74 is rendered unnecessary, and the number of parts can be reduced.

Fifth Embodiment

A self-driving vehicle, to which is applied a placement structure for a peripheral information detecting sensor relating to a fifth embodiment, is described next with reference to FIG. 9. Note that structures that are similar to those of the first embodiment are denoted by the same reference numerals, and description thereof is omitted.

Figure 9:
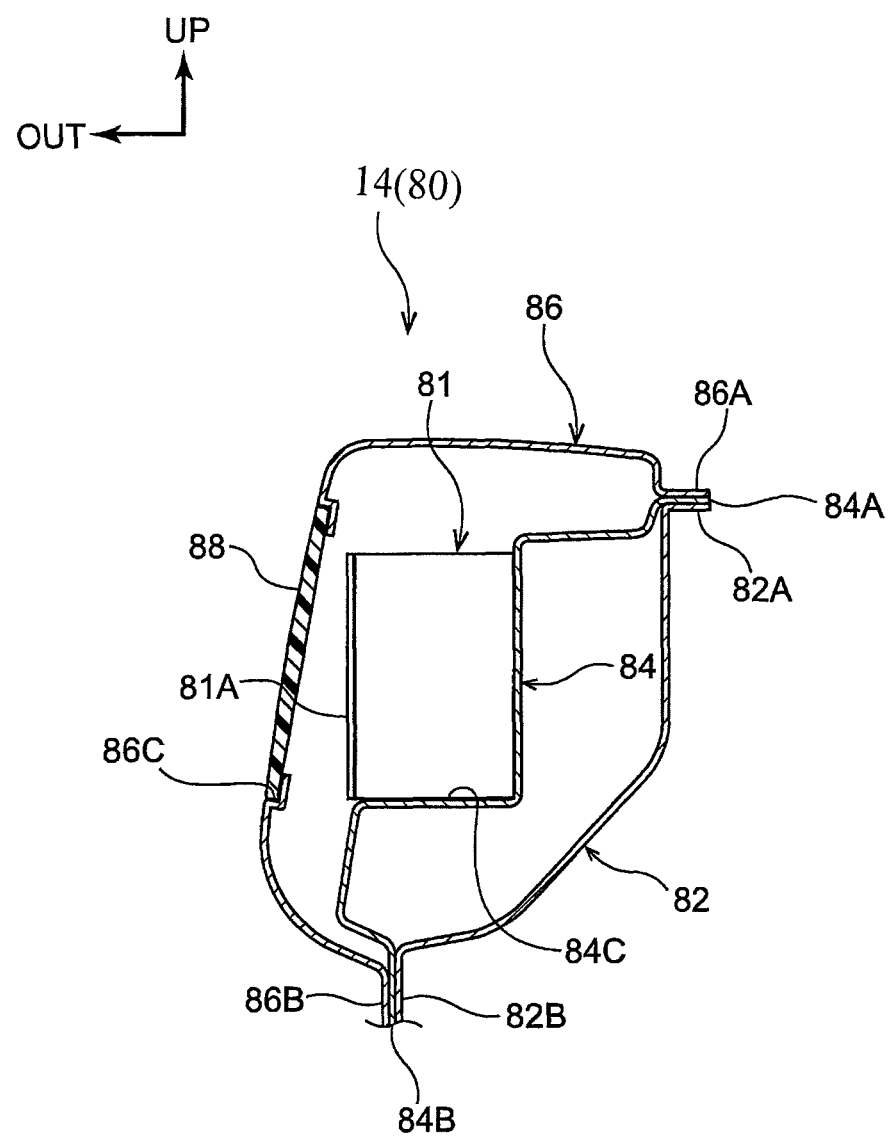
FIG. 9 is a cross-sectional view in which a roof side rail of a vehicle, in which a peripheral information detecting sensor relating to a fifth embodiment is installed, is cut vertically along the vehicle transverse direction.

As shown in FIG. 9, a peripheral information detecting sensor 81 relating to the present embodiment is disposed at the roof side rail 14 that serves as a vehicle skeleton member and is provided at the upper end portion of a side portion of a self-driving vehicle 80 (hereinafter simply called "vehicle 80"). Concretely, the roof side rail 14 includes a roof side rail inner panel 82 and a roof side rail outer panel 84, and is a closed cross-sectional structure (a hollow chamber). Further, the peripheral information detecting sensor 81 is mounted to the vehicle outer side of the roof side rail outer panel 84.

The roof side rail inner panel 82 is disposed at the vehicle inner side, and extends in the vehicle longitudinal direction. Further, an inner side upper flange 82A extends toward the vehicle transverse direction inner side from the upper end portion of the roof side rail inner panel 82. Moreover, an inner side lower flange 82B extends toward the vehicle lower side from the lower end portion of the roof side rail inner panel 82.

The roof side rail outer panel 84 is disposed further toward the vehicle outer side than the roof side rail inner panel 82, and extends in the vehicle longitudinal direction. Further, an outer side upper flange 84A extends toward the vehicle transverse direction inner side from the upper end portion of the roof side rail outer panel 84. The outer side upper flange 84A and the inner side upper flange 82A are joined by welding or the like. Moreover, an outer side lower flange 84B extends toward the vehicle lower side from the lower end portion of the roof side rail outer panel 84. The outer side lower flange 84B and the inner side lower flange 82B are joined by welding or the like.

Here, a concave portion (concavity) 84C that is recessed toward the vehicle inner side is formed in the vehicle vertical direction central portion of the roof side rail outer panel 84. The peripheral information detecting sensor 81 is mounted to this concave portion 84C by unillustrated fasteners such as bolts or the like. A detecting section 81A that detects peripheral information of the vehicle 80 is provided at the vehicle transverse direction outer side of the peripheral information detecting sensor 81.

A side outer panel 86 is disposed further toward the vehicle outer side than the peripheral information detecting sensor 81. The side outer panel 86 is disposed further toward the vehicle outer side than the roof side rail 14. An upper flange 86A extends toward the vehicle transverse direction inner side at the upper end portion of the side outer panel 86. The upper flange 86A is joined together with the inner side upper flange 82A and the outer side upper flange 84A. An unillustrated roof panel is mounted to the top surface side of the upper flange 86A.

A lower flange 86B extends toward the vehicle lower side at the lower end portion of the side outer panel 86. The lower flange 86B is joined together with the inner side lower flange 82B and the outer side lower flange 84B.

Here, an opening portion 86C is formed at the region, that faces the peripheral information detecting sensor 81, of the side outer panel 86. A transmission member 88 that serves as a cover is mounted to this opening portion 86C. The transmission member 88 is formed from a material that transmits therethrough the detection medium that the detecting section 81A of the peripheral information detecting sensor 81 detects, and, in the present embodiment, the transmission member 88 is formed from an opaque resin material. Further, the transmission member 88 is made to be the same color as the side outer panel 86.

(Operation and Effects)

Operation and effects of the vehicle 80, that is equipped with the peripheral information detecting sensor 81 relating to the present embodiment, are described next. In the present embodiment, the peripheral information detecting sensor 81 is mounted to the vehicle outer side of the roof side rail 14 that is a closed cross-sectional structure. Due thereto, the mounting rigidity can be ensured, and, even at times when the vehicle 80 is traveling, vibration of the peripheral information detecting sensor 81 can be suppressed. As a result, the detection accuracy of the peripheral information detecting sensor 81 can be maintained.

Further, in the present embodiment, the region, that faces the peripheral information detecting sensor 81, of the side outer panel 86 is formed by the transmission member 88. Due thereto, the detection medium that the detecting section 81A of the peripheral information detecting sensor 81 detects can be transmitted through, and the detection accuracy of the peripheral information detecting sensor 81 can be ensured.

Further, the transmission member 88 is formed from an opaque resin material, and is the same color as the side outer panel 86. Due thereto, the transmission member 88 is inconspicuous, and a deterioration in the design can be suppressed. Moreover, by placing the peripheral information detecting sensor 81 at the roof side rail 14, peripheral information can be detected over a wide range from the upper end portion of the vehicle 80. Other operations are similar to those of the first embodiment.

Note that, in the present embodiment, the transmission member 88 that serves as a cover is provided at the side outer panel 86, but the present embodiment is not limited to this. For example, the entire side outer panel 86 may be formed of a material that is similar to that of the transmission member 88, and by a member that has rigidity of the same extent as the side outer panel 86. By doing so, the transmission member 88 is rendered unnecessary, and the number of parts can be reduced.

Sixth Embodiment

A self-driving vehicle, to which is applied a placement structure for a peripheral information detecting sensor relating to a sixth embodiment, is described next with reference to FIG. 10 and FIG. 11. Note that structures that are similar to those of the first embodiment are denoted by the same reference numerals, and description thereof is omitted.

Figure 10:
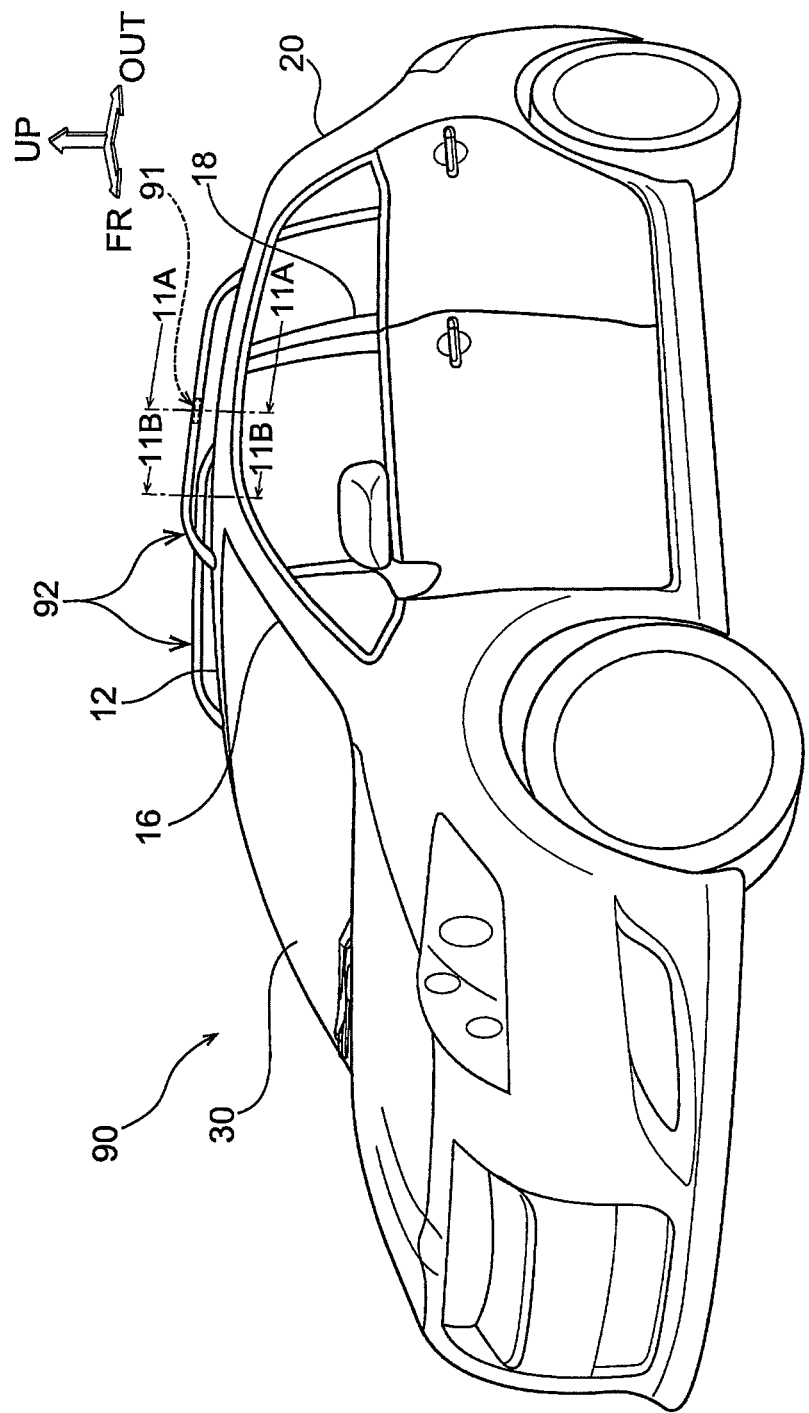
FIG. 10 is a side view showing, in an enlarged manner, a roof rail of a vehicle in which the peripheral information detecting sensor relating to a sixth embodiment is installed.
Figure 11A:
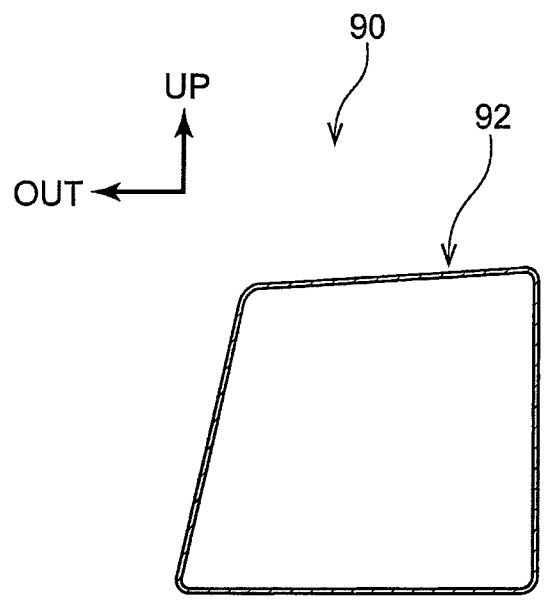
FIG. 11A is a cross-sectional view showing, in an enlarged manner, the state cut along line 11A-11A of FIG. 10.

As shown in FIG. 10, a peripheral information detecting sensor 91 relating to the present embodiment is mounted to a roof rail 92 that is disposed on the roof panel 12 of a self-driving vehicle 90 (hereinafter simply called "vehicle 90"). Here, at the roof rail 92, the general portion thereof, that is other than the region where the peripheral information detecting sensor 91 is disposed, is a closed cross-sectional structure (a hollow chamber) whose cross-section is substantially rectangular as shown in FIG. 11(A).

Figure 11B:
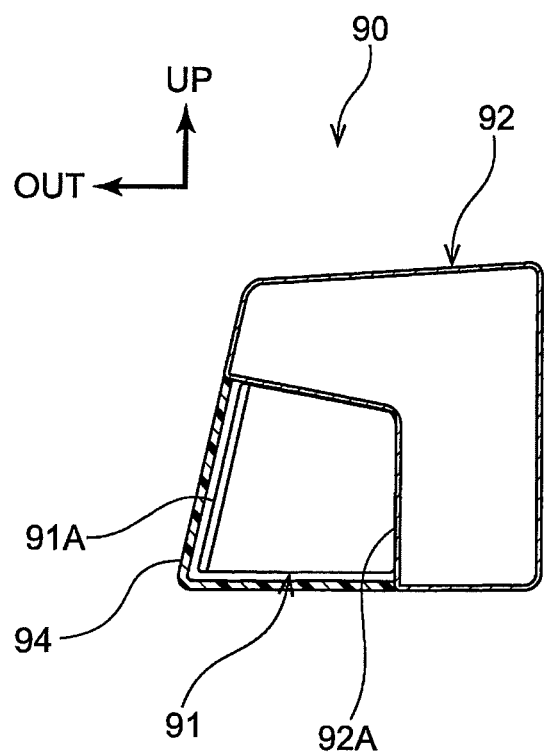
FIG. 11B is a cross-sectional view showing, in an enlarged manner, the state cut along line 11B-11B of FIG. 10.

On the other hand, as shown in FIG. 11(B), a concave portion (concavity) 92A, at which the vehicle transverse direction outer side and vehicle lower side corner portion of the roof rail 92 is recessed toward the inner side as seen in cross-section, is formed at the region of the roof rail 92 where the peripheral information detecting sensor 91 is disposed. Further, the peripheral information detecting sensor 91 is mounted to this concave portion 92A by unillustrated fasteners such as bolts or the like. A detecting section 91A that detects peripheral information of the vehicle 90 is provided at the vehicle transverse direction outer side of the peripheral information detecting sensor 91.

Here, a transmission member 94 that serves as a cover is disposed at the region, at which the peripheral information detecting sensor 91 is disposed, of the roof rail 92. The peripheral information detecting sensor 91 is covered from the vehicle transverse direction outer side by this transmission member 94. Further, the transmission member 94 is formed from a material that transmits therethrough the detection medium that the detecting section 91A of the peripheral information detecting sensor 91 detects, and, in the present embodiment, the transmission member 94 is formed from an opaque resin material. Further, the transmission member 94 is made to be the same color as the roof rail 92.

(Operation and Effects)

Operation and effects of the vehicle 90, that is equipped with the peripheral information detecting sensor 91 relating to the present embodiment, are described next. In the present embodiment, the peripheral information detecting sensor 91 is mounted to the vehicle transverse direction outer side of the roof rail 92 that is a closed cross-sectional structure. Due thereto, the mounting rigidity can be ensured in the same way as in a case in which the peripheral information detecting sensor 91 is mounted to a vehicle skeleton member that is made to have a closed cross-sectional structure. As a result, even at times when the vehicle 90 is traveling, vibration of the peripheral information detecting sensor 91 can be suppressed, and the detection accuracy of the peripheral information detecting sensor 91 can be maintained.

Further, in the present embodiment, the region, that faces the peripheral information detecting sensor 91, of the roof rail 92 is formed by the transmission member 94. Due thereto, the detection medium that the detecting section 91A of the peripheral information detecting sensor 91 detects can be transmitted through, and the detection accuracy of the peripheral information detecting sensor 91 can be ensured.

Further, the transmission member 94 is formed from an opaque resin material, and is the same color as the roof rail 92. Due thereto, the transmission member 94 is inconspicuous, and a deterioration in the design can be suppressed. Moreover, because the peripheral information detecting sensor 91 detects peripheral information from the roof rail 92 that is at the upper end portion of the vehicle 90, peripheral information can be detected over an even wider range as compared with a case in which the peripheral information detecting sensor is disposed at the front pillar 16 or the like. Other operations are similar to those of the first embodiment.

Seventh Embodiment

A self-driving vehicle, to which is applied a placement structure for a peripheral information detecting sensor relating to a seventh embodiment, is described next with reference to FIG. 12. Note that structures that are similar to those of the first embodiment are denoted by the same reference numerals, and description thereof is omitted.

Figure 12:
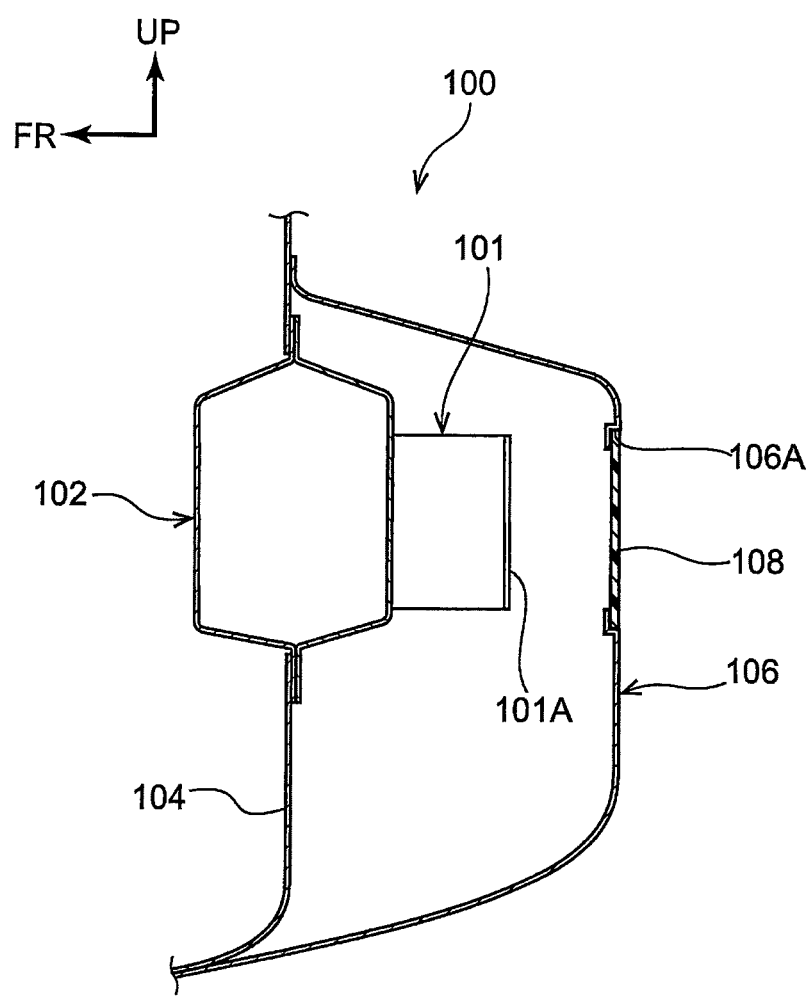
FIG. 12 is a cross-sectional view in which a rear bumper of a vehicle, in which a peripheral information detecting sensor relating to a seventh embodiment is installed, is cut vertically along the vehicle longitudinal direction.

As shown in FIG. 12, a peripheral information detecting sensor 101 relating to the present embodiment is disposed at the vehicle lower portion of the vehicle rear side of a self-driving vehicle 100 (hereinafter simply called "vehicle 100"). Concretely, a rear floor pan 104 is disposed at the vehicle lower portion of the vehicle rear side, and a rear bumper reinforcement 102 (hereinafter simply called "rear bumper RF 102"), that serves as a vehicle skeleton member and has a closed cross-sectional structure, is disposed at the rear end portion of this rear floor pan 104. Further, the peripheral information detecting sensor 101 is mounted to the vehicle outer side (the vehicle rear side) of the rear bumper RF 102 by unillustrated fasteners such as bolts or the like. A detecting section 101A that detects peripheral information of the vehicle 100 is provided at the peripheral information detecting sensor 101.

Here, a rear bumper cover 106 is disposed further toward the vehicle rear side than the peripheral information detecting sensor 101, so as to cover the rear bumper RF 102 from the vehicle rear side. Further, an opening portion 106A is formed in the region, that faces the peripheral information detecting sensor 101 in the vehicle longitudinal direction, of the rear bumper cover 106. A transmission member 108 serving as a cover is mounted to this opening portion 106A.

The transmission member 108 is formed from a material that transmits therethrough the detection medium that the detecting section 101A of the peripheral information detecting sensor 101 detects, and, in the present embodiment, the transmission member 108 is formed of an opaque resin material. Further, the transmission member 108 is made to be the same color as the rear bumper cover 106.

(Operation and Effects)

Operation and effects of the vehicle 100, that is equipped with the peripheral information detecting sensor 101 relating to the present embodiment, are described next. In the present embodiment, the peripheral information detecting sensor 101 is mounted to the vehicle outer side of the rear bumper RF 102 that is a closed cross-sectional structure. Due thereto, the mounting rigidity can be ensured, and, even at times when the vehicle 100 is traveling, vibration of the peripheral information detecting sensor 101 can be suppressed. As a result, the detection accuracy of the peripheral information detecting sensor 101 can be maintained.

Further, in the present embodiment, the region, that faces the peripheral information detecting sensor 101, of the rear bumper cover 106 is formed by the transmission member 108. Due thereto, the detection medium that the detecting section 101A of the peripheral information detecting sensor 101 detects can be transmitted through, and the detection accuracy of the peripheral information detecting sensor 101 can be ensured.

Further, the transmission member 108 is formed of an opaque resin material, and is the same color as the rear bumper cover 106. Due thereto, the transmission member 108 is inconspicuous, and a deterioration in the design can be suppressed. Moreover, by placing the peripheral information detecting sensor 101 at the vehicle rear portion, peripheral information of the rear side of the vehicle 100 can be detected effectively. Other operations are similar to those of the first embodiment.

Note that, in the present embodiment, the transmission member 108 that serves as a cover is provided at the rear bumper cover 106, but the present embodiment is not limited to this. For example, the entire rear bumper cover 106 may be formed of a material that is similar to that of the transmission member 108, and by a member that has rigidity of the same extent as the rear bumper cover 106. By doing so, the transmission member 108 is rendered unnecessary, and the number of parts can be reduced.

Eighth Embodiment

A self-driving vehicle, to which is applied a placement structure for a peripheral information detecting sensor relating to an eighth embodiment, is described next with reference to FIG. 13. Note that structures that are similar to those of the first embodiment are denoted by the same reference numerals, and description thereof is omitted.

Figure 13:
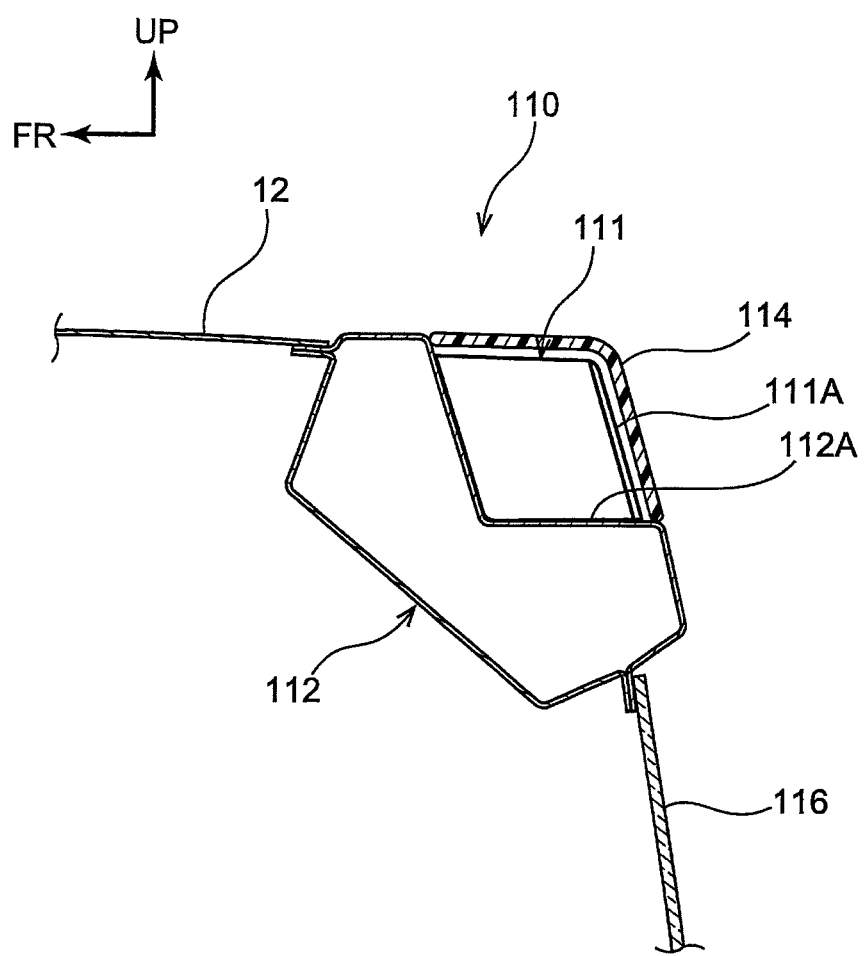
FIG. 13 is a cross-sectional view in which a rear header of a vehicle, in which a peripheral information detecting sensor relating to an eighth embodiment is installed, is cut vertically along the vehicle longitudinal direction.

As shown in FIG. 13, a peripheral information detecting sensor 111 relating to the present embodiment is disposed at the vehicle upper portion of the vehicle rear side of a self-driving vehicle 110 (hereinafter simply called "vehicle 110"). Concretely, the roof panel 12 is disposed at the vehicle upper portion, and a rear header 112, that serves as a vehicle skeleton member that has a closed cross-sectional structure, is disposed at the rear end portion of this roof panel 12.

The rear header 112 extends in the vehicle transverse direction between the roof side rails, and a rear window glass 116 is mounted to the lower end portion of the rear header 112. Further, a concave portion (concavity) 112A is formed in the vehicle outer side (the vehicle rear side) of the rear header 112. The peripheral information detecting sensor 111 is mounted to this concave portion 112A by unillustrated fasteners such as bolts or the like. Further, a detecting section 111A that detects peripheral information of the vehicle 110 is provided at the peripheral information detecting sensor 111. Note that the concave portion 112A is not formed at the general portion, that is the region other than the region where the peripheral information detecting sensor 111 is disposed, of the rear header 112, and a transmission member 114 that is described later also is not disposed thereat.

The transmission member 114 that serves as a cover is disposed further toward the vehicle outer side than the peripheral information detecting sensor 111. The peripheral information detecting sensor 111 is covered from the vehicle outer side by this transmission member 114. Here, the transmission member 114 is formed from a material that transmits therethrough the detection medium that the detecting section 111A of the peripheral information detecting sensor 111 detects, and, in the present embodiment, the transmission member 114 is formed from an opaque resin material. Further, the transmission member 114 is made to be the same color as the rear header 112.

(Operation and Effects)

Operation and effects of the vehicle 110, that is equipped with the peripheral information detecting sensor 111 relating to the present embodiment, are described next. In the present embodiment, the peripheral information detecting sensor 111 is mounted to the vehicle outer side of the rear header 112 that is a closed cross-sectional structure. Due thereto, the mounting rigidity can be ensured, and, even at times when the vehicle 110 is traveling, vibration of the peripheral information detecting sensor 111 can be suppressed. As a result, the detection accuracy of the peripheral information detecting sensor 111 can be maintained.

Further, in the present embodiment, the region, that faces the peripheral information detecting sensor 111, of the rear header 112 is formed by the transmission member 114. Due thereto, the detection medium that the detecting section 111A of the peripheral information detecting sensor 111 detects can be transmitted through, and the detection accuracy of the peripheral information detecting sensor 111 can be ensured.

Further, the transmission member 114 is formed from an opaque resin material, and is the same color as the rear header 112. Due thereto, the transmission member 114 is inconspicuous, and a deterioration in the design can be suppressed. Moreover, due to the peripheral information detecting sensor 111 being disposed at the vehicle upper portion of the vehicle rear side, peripheral information of the rear side of the vehicle 110 can be detected over a wide range. Other operations are similar to those of the first embodiment.

The first embodiment through the eighth embodiment have been described above, but the disclosure is not limited to the above-described structures, and, of course, can be implemented in various forms other than the above-described structures. For example, the above embodiments describe structures in which the peripheral information detecting sensor is disposed at the vehicle left side, but the disclosure is not limited to this. For example, a peripheral information detecting sensor may be disposed at the vehicle right side, or a pair of peripheral information detecting sensors may be disposed at the vehicle right side and the vehicle left side. Further, the structures of the above-described embodiments may be combined. For example, there may be a structure in which a peripheral information detecting sensor is disposed at each of the front pillar, the roof side rail, and the rear header.

Although the transmission member is formed from an opaque resin material in the above-described second embodiment through eight embodiment, the disclosure is not limited to this. The transmission member may be formed of another material, provided that the transmission member is a member that transmits therethrough the detection medium that the detecting section of the peripheral information detecting sensor detects. For example, in a case in which a laser radar or an optical camera is used as the peripheral information detecting sensor, the transmission member may be formed from a transparent resin material or the like that transmits laser light or visible light therethrough. Further, in a case in which an ultrasonic wave sensor is used as the peripheral information detecting sensor, the transmission member may be formed from a material that transmits ultrasonic waves therethrough.

Moreover, in the above-described third embodiment through eighth embodiment, wire harnesses are not illustrated, but the third through eighth embodiments may be structures in which a wire harness is disposed from the peripheral information detecting sensor along a vehicle skeleton member, in the same way as in the first embodiment and the second embodiment. Further, the third through eighth embodiments may be structures in which a guide groove is formed in a vehicle skeleton member, and the wire harness is placed in this guide groove.

Moreover, with regard to the place where the peripheral information detecting sensor is mounted, it suffices for the peripheral information detecting sensor to be mounted to the vehicle outer side of a vehicle skeleton member having a closed cross-sectional structure, and the place of mounting is not limited to the places described in the above embodiments. For example, the peripheral information detecting sensor may be mounted to the vehicle outer side of a rocker.

Further, the shape and size of the peripheral information detecting sensor, and the position and shape of the detecting section, in the above-described embodiments are not particularly limited, and may be changed appropriately in accordance with the type of or the placed position of or the like of the peripheral information detecting sensor.

What is claimed is:

1. A sensor placement structure comprising:
   a vehicle skeleton member of a vehicle, the vehicle skeleton member having a closed cross-section defining a hollow chamber that is bounded on all sides by walls of the vehicle skeleton member;
   a peripheral information detecting sensor that is mounted to a vehicle outer side of the vehicle skeleton member, the peripheral information detecting sensor having a detecting section that detects information about a periphery of the vehicle;
   a cover that covers the peripheral information detecting sensor from the vehicle outer side of the peripheral information detecting sensor, the cover being composed of a material that is transmissive of a detection medium that is detected by the detecting section; and
   a wire harness extending from the peripheral information detecting sensor and disposed along an outer surface of the vehicle skeleton member, wherein
   a guide groove, in which the wire harness is placed, is formed in the outer surface of the vehicle skeleton member.

2. The sensor placement structure of claim 1, wherein the vehicle skeleton member is formed by a member that is electrically conductive.

3. The sensor placement structure of claim 1, wherein
   the peripheral information detecting sensor detects the information about the periphery of the vehicle by transmitting and receiving radio waves at the detecting section, and
   the cover is opaque and transmissive of the radio waves.

4. The sensor placement structure of claim 3, wherein the cover is a same color as a body of the vehicle.

5. The sensor placement structure of claim 1, wherein the peripheral information detecting sensor is disposed at a vehicle inner side of a fender panel.

6. The sensor placement structure of claim 1, wherein the peripheral information detecting sensor is disposed at an upper portion of a front pillar of the vehicle.

7. The sensor placement structure of claim 1, wherein the cover is transmissive of radio waves.

8. The sensor placement structure of claim 1, wherein the cover is transmissive of ultrasonic waves.

9. The sensor placement structure of claim 1, wherein the cover is transmissive of visible light.

10. The sensor placement structure of claim 1, wherein the cover is transmissive of laser light.

11. A self-driving vehicle comprising:
    the sensor placement structure of claim 1; and
    a processor, coupled to the peripheral information detecting sensor, and that controls traveling of the vehicle based on the information about the periphery of the vehicle detected by the peripheral information detecting sensor.

12. The sensor placement structure of claim 1, wherein the cover is attached to the vehicle skeleton member separately from the peripheral information detecting sensor.

13. The sensor placement structure of claim 1, wherein the cover is attached to the vehicle skeleton member and is spaced from the peripheral information detecting sensor.

14. A sensor placement structure comprising:
    a roof rail disposed on a roof panel of a vehicle, the roof rail having a closed cross-section defining a hollow chamber that is bounded on all sides by walls of the roof rail;
    a peripheral information detecting sensor that is mounted to a vehicle transverse direction outer side of the roof rail, the peripheral information detecting sensor having a detecting section that detects information about a periphery of the vehicle;
    a cover that covers the peripheral information detecting sensor from the vehicle transverse direction outer side, the cover being composed of a material that is transmissive of a detection medium that is detected by the detecting section; and
    a wire harness extending from the peripheral information detecting sensor and disposed along an outer surface of the roof rail, wherein
    a guide groove, in which the wire harness is placed, is formed in the outer surface of the roof rail.

15. The sensor placement structure of claim 14, wherein the roof rail extends along a vehicle longitudinal direction.

16. The sensor placement structure of claim 14, wherein the cover is attached to the roof rail separately from the peripheral information detecting sensor.

17. The sensor placement structure of claim 14, wherein the cover is attached to the roof rail and is spaced from the peripheral information detecting sensor.

18. A self-driving vehicle comprising:
the sensor placement structure of claim 14; and
a processor, coupled to the peripheral information detecting sensor, and that controls traveling of the vehicle based on the information about the periphery of the vehicle detected by the peripheral information detecting sensor.

* * * * *